US006477514B1

(12) United States Patent
Gil et al.

(10) Patent No.: US 6,477,514 B1
(45) Date of Patent: **\*Nov. 5, 2002**

(54) AUTOMATED SELF-SERVICE MAIL PROCESSING AND STORING SYSTEMS

(75) Inventors: Asher Gil; John B. Daron; Celestine Vettical, all of Houston, TX (US)

(73) Assignee: PI Electronics Corp., Houston, TX (US)

(\*) Notice: Subject to any disclaimer, the term of this patent is extended or adjusted under 35 U.S.C. 154(b) by 0 days.

This patent is subject to a terminal disclaimer.

(21) Appl. No.: 09/493,800

(22) Filed: Jan. 28, 2000

Related U.S. Application Data

(63) Continuation of application No. 09/013,444, filed on Jan. 26, 1998, now abandoned, which is a continuation of application No. 08/720,927, filed on Oct. 4, 1996, now abandoned, which is a continuation of application No. 08/284,910, filed on Aug. 2, 1994, now Pat. No. 5,586,037, which is a continuation-in-part of application No. 07/994,182, filed on Dec. 21, 1992, now abandoned, which is a continuation of application No. 07/678,863, filed on Apr. 1, 1991, now abandoned.

(51) Int. Cl.[7] .............................................. G07B 17/00
(52) U.S. Cl. .................... 705/410; 177/25.15; 705/400; 705/407
(58) Field of Search ..................... 177/25.15; 235/375; 705/16, 17, 400, 406, 407, 408, 410

(56) References Cited

U.S. PATENT DOCUMENTS 2,680,082 A \* 9/1954 Kolisch ................... 705/414 X
2,688,878 A \* 9/1954 Kolisch ................... 705/414 X (List continued on next page.)

FOREIGN PATENT DOCUMENTS

| EP | 0462427 | \* 12/1991 |
| JP | 06-149815 | \* 5/1994 |
| WO | WO 92/17861 | \* 10/1992 |
| WO | WO 95/30132 | \* 11/1995 |

OTHER PUBLICATIONS

"Futuristic Mailing system set for Expo", Apr. 29, 1991, The Houston Post, p. C–5.\*
U. S. Postal Service brochure for "Autopost", 1989.\*

(List continued on next page.)

Primary Examiner—Edward R. Cosimano
(74) Attorney, Agent, or Firm—Akin, Gump, Strauss, Hauer & Feld, L.L.P.

(57) ABSTRACT

An automated self-service mail processing and storing system is disclosed which is capable of receiving input from and providing instructions to a user via a touch-sensitive screen or a digitized voice system. The system is capable of weighing the mail item, receiving user identification information from a credit/debit card, for example, for payment, calculating the charge for shipment and deducting that amount from the user's charge account, and securely storing the item for subsequent pickup. The system contains a novel weighing means capable of detecting minute vibrations for purposes of obtaining an accurate weight amount. The system may also contain a tracking bar code generation means and a tracking bar code verification system. Optionally, a dual floppy disk system allows the user to send electronic mail, and a built-in facsimile apparatus allows the user to send "FAX" information through the telephone line. Also disclosed is a two-way communication means coupled between the mail processing and storing system computer and a remote computer station for providing such functions as credit authorization and charge reporting, transaction and tracking information transfers, error reporting, etc.

12 Claims, 41 Drawing Sheets

U.S. PATENT DOCUMENTS

| | | | | |
|---|---|---|---|---|
| 2,708,368 A | * | 5/1955 | Kolisch | 705/414 X |
| 2,812,904 A | * | 11/1957 | Kolisch | 705/414 X |
| 3,436,968 A | * | 4/1969 | Unger et al. | 364/567 X |
| 4,024,380 A | * | 5/1977 | Gun | 705/408 X |
| 4,253,158 A | * | 2/1981 | McFiggans | 705/401 X |
| 4,268,817 A | * | 5/1981 | Simjian | 705/410 |
| 4,390,952 A | * | 6/1983 | Dlugos | 364/464.03 |
| 4,393,454 A | * | 7/1983 | Soderberg | 705/410 |
| 4,415,048 A | * | 11/1983 | Teraoka | 177/5 |
| 4,511,793 A | * | 4/1985 | Racanelli | 705/404 |
| 4,516,209 A | * | 5/1985 | Scribner | 705/406 |
| 4,629,871 A | * | 12/1986 | Scribner et al. | 235/375 |
| 4,651,921 A | * | 3/1987 | McKellar | 235/25 |
| 4,787,046 A | * | 11/1988 | Feinland et al. | 705/407 |
| 4,796,193 A | * | 1/1989 | Pitchenik | 705/408 |
| 4,800,506 A | * | 1/1989 | Axelrod et al. | 364/478.15 |
| 4,802,218 A | * | 1/1989 | Wright et al. | 705/60 |
| 4,814,995 A | * | 3/1989 | Daniels, Jr. | 705/402 |
| 4,825,053 A | * | 4/1989 | Caille | 235/380 |
| 4,836,352 A | * | 6/1989 | Tateno et al. | 705/407 X |
| 4,837,701 A | * | 6/1989 | Sansone et al. | 705/404 |
| 4,837,714 A | * | 6/1989 | Brookner et al. | 364/550 |
| 4,862,386 A | * | 8/1989 | Axelrod et al. | 395/768 |
| 4,864,618 A | * | 9/1989 | Wright et al. | 380/51 |
| 4,868,757 A | * | 9/1989 | Gil | 705/406 |
| 4,872,119 A | * | 10/1989 | Kajimoto | 705/402 |
| 4,900,903 A | * | 2/1990 | Wright et al. | 235/381 |
| 4,900,904 A | * | 2/1990 | Wright et al. | 235/381 |
| 4,900,905 A | * | 2/1990 | Pusic | 235/381 |
| 4,901,241 A | * | 2/1990 | Schneck | 705/401 |
| 4,923,022 A | * | 5/1990 | Hsieh | 705/406 X |
| 4,940,887 A | * | 7/1990 | Wu | 705/406 X |
| 4,956,782 A | * | 9/1990 | Freeman et al. | 705/406 |
| 4,980,542 A | * | 12/1990 | Jackson et al. | 235/375 |
| 5,025,386 A | * | 6/1991 | Pusic | 700/227 |
| 5,065,000 A | * | 11/1991 | Pusic | 235/381 |
| 5,173,862 A | | 12/1992 | Fedirchuk et al. | 364/464.02 |
| 5,174,398 A | | 12/1992 | Ng | 177/1 |
| 5,191,533 A | | 3/1993 | Haug | 364/464.03 |
| 5,197,042 A | | 3/1993 | Brookner et al. | 235/375 X |
| 5,202,834 A | | 4/1993 | Gilham | 364/464.02 |
| 5,233,532 A | * | 8/1993 | Ramsden | 705/407 |
| 5,272,640 A | * | 12/1993 | Wu | 705/406 |
| 5,272,648 A | | 12/1993 | Wu | 364/464.03 X |
| 5,313,404 A | * | 5/1994 | Wu | 700/227 |
| 5,326,181 A | | 7/1994 | Eisner et al. | 235/432 X |
| 5,340,948 A | * | 8/1994 | Ramsden | 177/25.15 |
| 5,365,044 A | | 11/1994 | Hesshaus | 235/375 |
| 5,369,221 A | * | 11/1994 | Ramsden | 177/25.15 |
| 5,369,258 A | * | 11/1994 | Sansone et al. | 235/381 |
| 5,373,450 A | | 12/1994 | Gallagher et al. | 364/478 |
| 5,421,778 A | | 6/1995 | Kouramanis | 462/2 |
| 5,444,630 A | | 8/1995 | Dlugos | 364/464.02 |
| 5,457,636 A | * | 10/1995 | Sansone et al. | 364/479.05 |
| 5,481,464 A | * | 1/1996 | Ramsden | 705/407 |
| 5,586,037 A | * | 12/1996 | Gil et al. | 364/464.03 |
| 5,615,120 A | * | 3/1997 | Schwartz et al. | 705/407 |
| 5,656,799 A | * | 8/1997 | Ramsden et al. | 177/2 |
| 5,719,776 A | * | 2/1998 | Haug | 704/411 |
| 5,826,246 A | * | 10/1998 | Bator et al. | 705/403 |
| 5,831,220 A | * | 11/1998 | Ramsden et al. | 177/1 |

OTHER PUBLICATIONS

U. S. Postal Service brochure for "Infopost", 1989.*

Strategic Financial Planning System brochure; 1989, 2 pages.*

U.S. Postal Service bid solicitation document; Sep. 11, 1986.*

"US Post Ofice Tests Self–Service Centers (The US Postal Service has begun field testing self–service mailing centers built by Unisys Corp. in six locations in Washington's Virginia suburbs)": Feb. 24, 1994, Newsbytes News Network.*

* cited by examiner

AUTOMATED SELF-SERVICE MAIL PROCESSING AND STORING SYSTEMS

CROSS REFERENCE TO RELATED APPLICATIONS

This is a continuation of pending application Ser. No. 09/013,444, filed Jan. 26, 1998, now abandoned, which is a continuation of Ser. No. 08/720,927, filed Oct. 4, 1996, now abandoned, which is a continuation of Ser. No. 08/284,910, filed Aug. 2, 1994, now U.S. Pat. No. 5,586,037, which is a continuation-in-part of application Ser. No. 07/994,182, filed Dec. 21, 1992, now abandoned, which is a file wrapper continuation of application Ser. No. 07/678,863, filed Apr. 1, 1991, now abandoned, all of which are hereby incorporated by reference.

MICROFICHE APPENDIX

A total of (2) microfiche and one hundred fifteen (115) frames are included in the appendix.

BACKGROUND OF THE INVENTION

1. Field of the Invention

The present invention is related to automated self-service systems for processing and storing items such as letters and packages for subsequent shipment by a commercial carrier.

The attached microfiche appendix sets forth copyrighted subject matter. No objection is made to reproduction of the appendix solely in connection with reproducing any patent that may issue from this application, but all other rights under copyright law are reserved.

2. Description of the Related Art

Presently, many commercial carriers such as the United States Postal Office and Federal Express, for example, provide drop boxes whereby individuals may ship their letters or packages without having to travel to the carrier's particular shipping station. A disadvantage of this system is that such boxes cannot be used where the item must be weighed prior to shipping in order to calculate the cost. Another disadvantage is that often the user must have a pre-assigned charge account, or he or she must use a specialized mailing envelope. In addition, the types of mail services from which a user may wish to use are very limited.

While perhaps not widely used commercially, there are several types of automated self-service mailing machines for processing mail for shipment described in various U.S. patents. U.S. Pat. No. 5,233,532 to Ramsden, for example, is directed to a mailing system which allows a user to process and store mail items for subsequent pick-up by a commercial carrier. In particular, the user is able to enter identification information into the system for purposes of payment, enter destination information for shipment, weigh the item, obtain a charge for shipping the item, and deposit the item into a locked storage area. The system contains an intermediate deposit area ("secured deposit means") which is separated by two inner doors from the storage area. The system contains an electronic scale separate from the intermediate deposit area. After the item is weighed, it is placed into the intermediate deposit area. Once the user closes an outer door to the intermediate area, the item is moved through the inner doors by a series of rollers into a storage area. While this reference suggests the re-weighing of the item to obtain an accurate weight, there is no mechanism to prevent the user from weighing a lighter object to obtain a low cost, and then placing into the intermediate deposit area the heavier item to be shipped.

U.S. Pat. Nos. 5,065,000 ("'000"), 4,923,022 ("'022"), and 5,025,386 ("'386") to Pusic are also directed to automated mail systems designed to process and store items, in particular letters. The systems described in these references contain internal weighing means and means for printing machine-readable information (i.e. bar codes) onto the item to be mailed. These references do not appear to teach or suggest a single, rotatable postage meter for generating and dispensing postage meter stamps or strips, nor do they teach a weighing scale capable of detecting minute vibrations that will not operate until such vibrations are absent. Moreover, the references do not teach a tracking bar code verification system to verify that a letter has a tracking bar code or a readable tracking bar code on it.

Thus, it is desirable to have an automatic self-service mail processing and shipping system that allows a user to weigh the mail item securely and accurately to prevent tampering, select from several different mail services (e.g. package or letter, First Class or International), calculate and pay the charge for shipping, obtain a receipt, securely store the item for subsequent pick-up by a commercial carrier, and that is fully capable of processing and storing packages as well as letters. It is also desirable to have a system that includes a single postage meter that is capable of printing a stamp directly onto a letter as well as dispense a postage meter strip for subsequent affixation onto a package or letter.

Certain carriers, such as the United Parcel Service and Federal Express, for example, require that tracking bar codes be placed onto the letters or packages. It is therefore also desirable to have a system that is capable of not only generating a tracking bar code for affixation onto a shipping item, but also have a means for verifying that the item contains the required tracking bar code or contains a tracking bar code that can be read or detected by a bar code scanner.

SUMMARY OF THE INVENTION

The present invention is directed to automated self-service mailing systems which will process and securely store packages and letters of various sizes for subsequent pick-up by a commercial carrier. In certain embodiments, the inventive system allows the user to select from a number of different type of mailing service transactions. Specifically, the inventive system includes:

(a) an outer housing, (b) a computer;

(c) a communication means contained on the outside of said outer housing and coupled to said computer for communicating instructions to said user on how to operate said system to process an item for mailing;

(d) a user input receiving means positioned on the outside of said outer housing and coupled to said computer and said communicating means for receiving input from said user to operate said system;

(e) a payment means coupled to the computer for accepting and verifying payment for processing, storing, and shipping the item for mailing;

(f) a mail service selection data entry means coupled to said computer for receiving data from a user relating to a type of mail service desired by said user;

(g) a shipping designation data entry means coupled to said computer for receiving data from a user relating to the shipping designation of the item;

(h) a postage stamp printing and dispensing means coupled to said computer for printing a postage meter stamp directly onto said item wherein said item is a letter, and for printing and dispensing a postage meter stamp for subsequent affixation onto said item;

(i) a storage area contained within said outer housing for storing processed items for subsequent pick-up;

(j) a secured item acceptance area contained within said outer housing and further comprising an outer door positioned on said front side of said outer housing and coupled to said computer, a platform for holding said item, an inner back door movably attached to said platform, a weighing means mounted below said platform, and a depositing means for depositing said item into said storage area; and (k) a determining means including said computer for determining the required postage for shipping said item, said determining means being coupled to said shipping designation data entry means, said mailing service selection data entry means, and said weighing means.

In certain embodiments, the inventive system is designed to process and store letters separately from packages, and specifically include:

(a) an outer housing;

(b) a computer;

(c) a communication means contained on the outside of said outer housing and coupled to said computer for communicating instructions to said user on how to operate said system to process a letter for mailing;

(d) a user input receiving means positioned on the outside of said outer housing and coupled to said computer and said communicating means for receiving input from said user to operate said system to process said letter for mailing;

(e) a payment means coupled to the computer for accepting and verifying payment for processing, storing, and shipping the item for mailing;

(f) a mail service selection data entry means coupled to said computer for receiving data from a user relating to a type of mail service desired by said user;

(g) a shipping designation data entry means coupled to said computer for receiving data from a user relating to the shipping designation of the letter;

(h) a postage printing means contained within said outer housing and coupled to said computer for printing a postage meter stamp directly onto said letter;

(i) a transport means, preferably an automatic feed mechanism, contained within said outer housing and coupled to said computer for transporting a letter to said postage printing means;

(j) a weighing means contained within said automatic transport means and coupled to said computer for weighing a letter prior to transport to said postage printing means;

(k) a determining means including said computer for determining the required postage for shipping said letter, said determining means being coupled to said shipping designation data entry means, said mailing service selection data entry means, and said weighing means; and (l) a storage means for storing said letter after processing.

In the most preferred embodiments of the present invention, the inventive system comprises a area for processing and storing letters separate from another area for processing and storing packages. Preferably in these embodiments, the system includes a rotatable postage meter which is capable of printing a postage meter stamp directly onto a letter and of printing and dispensing a postage meter strip directly to the user through the outer housing for affixation onto a letter or package. Preferably, the inventive system comprises a communication means coupling the computer to the postage meter to activate an automatic meter imprint date change mechanism.

The inventive system also has a novel weighing means for both packages and letters which can detect minute vibrations, such as those caused by a human hand, and thus will not weigh the device until such vibrations are no longer detected.

In other embodiments, the present invention comprises a tracking bar code generation device and a tracking bar code verification system for verifying that a tracking bar code is present on the item to be shipped.

The present invention is also directed to a two-way communication system, in particular a communication means coupled to the inventive mail processing and storing system's computer, for communicating between the inventive system and an external computer located at a remote station or location. Preferably, the two-way communication system operates to provide the following functions:

(1) Credit authorization and charge reporting;

(2) Transaction and tracking information transfer;

(3) Error reporting and machine-full notification to a remote monitoring station;

(4) Automatic money transfer to the postage meter; and (5) Electronic mail and EDI (electronic data interchange) facilities for users.

BRIEF DESCRIPTION OF THE DRAWINGS

The objects, advantages, and features of the invention will become more apparent by reference to the drawings which are appended hereto, wherein like numerals indicate like parts and wherein an illustrated embodiment of the invention is shown, in which.

DETAILED DESCRIPTION OF INVENTION

The present invention is related to automated self-service package and letter mailing systems which will process and securely store letters and packages of various sizes for subsequent pick-up by a carrier, such as the United States Postal Service (U.S.P.S.), United Parcel Service (U.P.S.), and Federal Express, for example. The mailing system (100) shown in FIG. 1A has been specifically configured to the requirements and specifications of the U.S.P.S.; however, obvious modifications will be readily appreciated by those of skill in the art having the benefit of the teachings and suggestions of the present invention, in particular such modifications as are required by a particular shipping carrier, and thus are contemplated to be within the scope of the present invention.

Figure 1A:
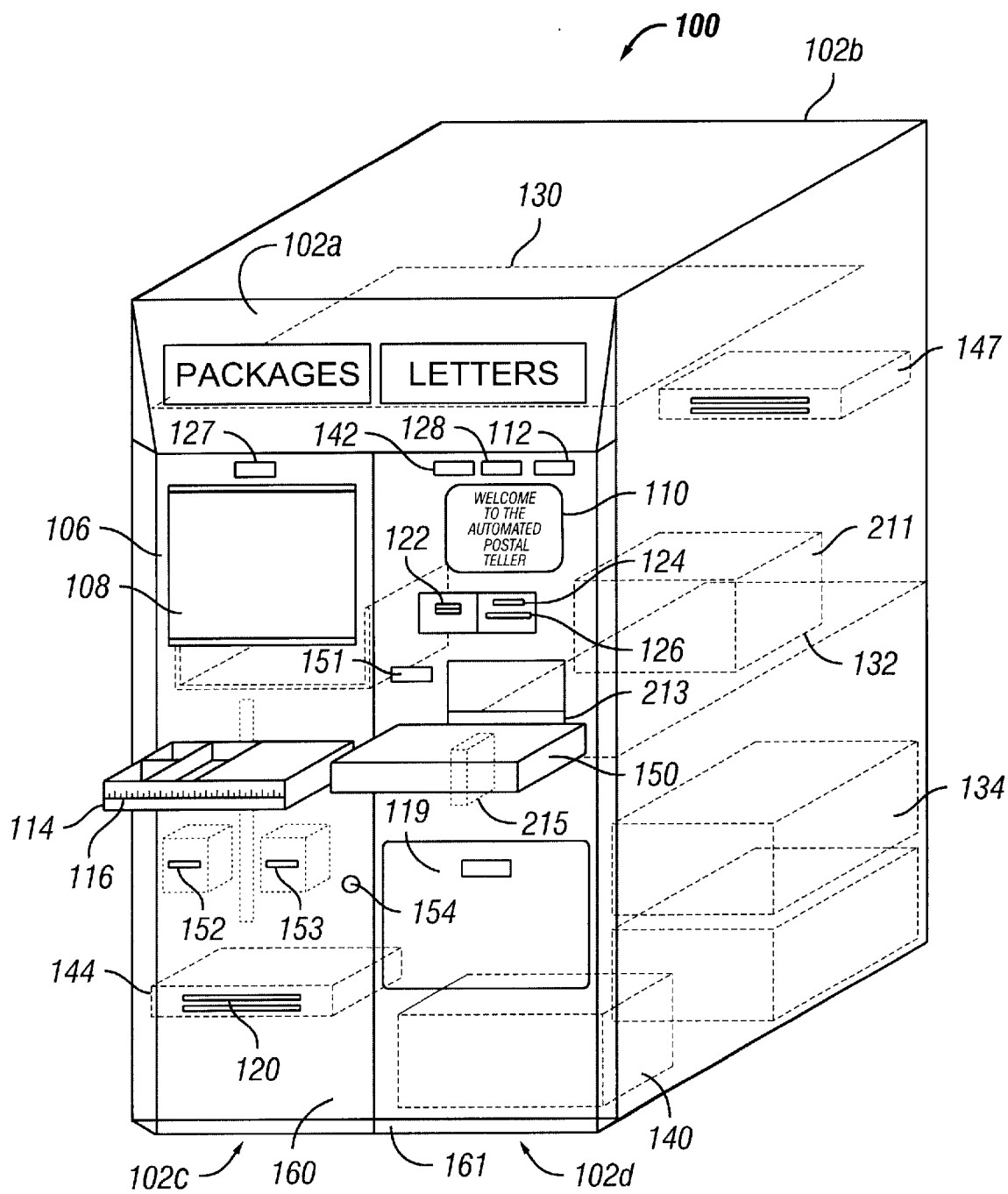
FIG. 1A is a perspective view of one embodiment of the inventive mail system for processing and storing items comprising a weighing means and storage area for weighing and storing items, especially packages, on one side of the system, and a separate weighing means and storage area on the other side of the system for weighing and storing letters.
Figure 1B:
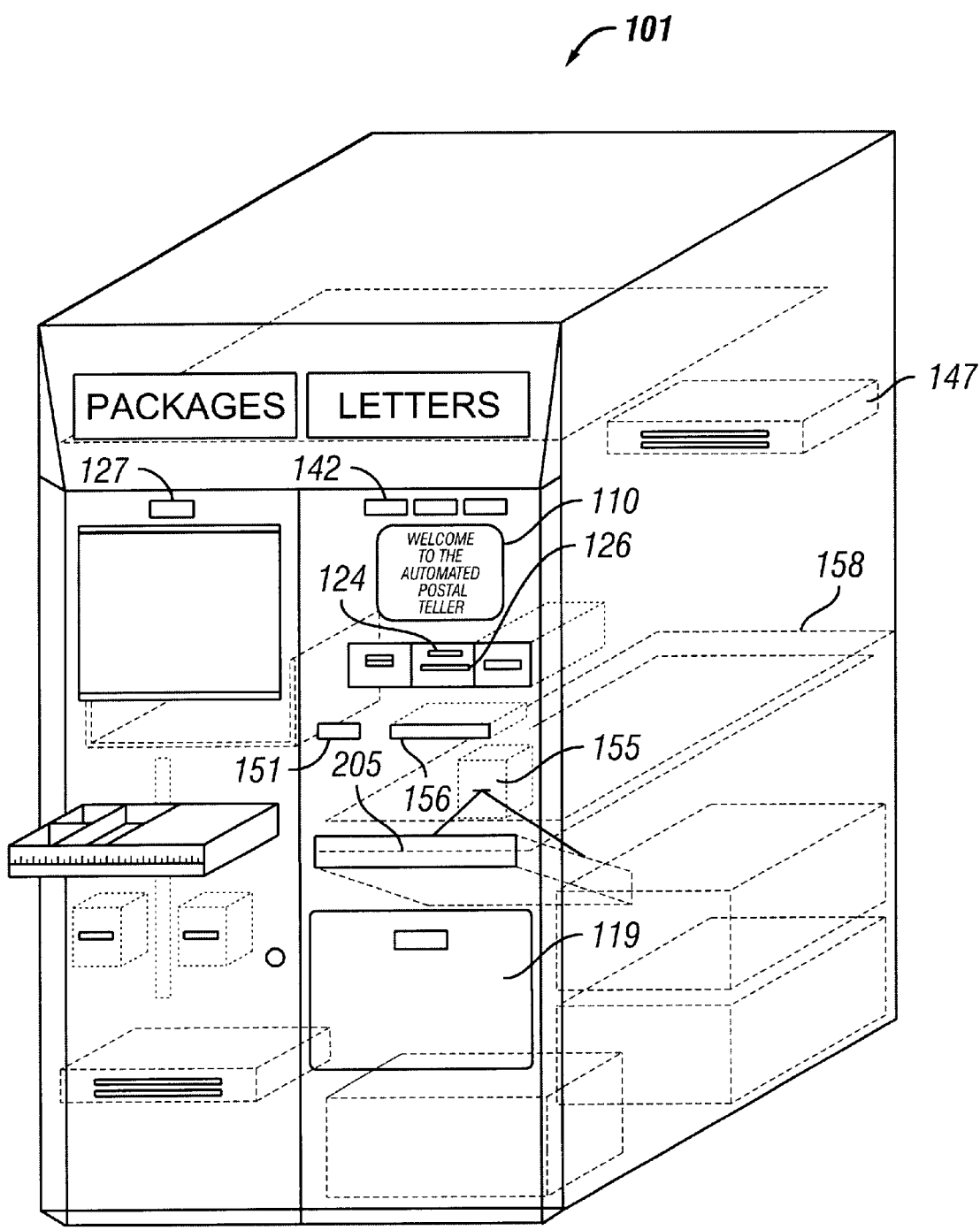
FIG. 1B is a perspective view of an alternate embodiment of the inventive mail system for processing and storing items comprising an internal tracking bar code verification system designed specifically for letters as well as an external tracking bar code verification system for mail items (i.e. letters and packages).

The inventive "mailing system" as described herein refers to the inventive automated self-service package and letter processing and storing system as depicted in the figures and more fully described and claimed below. There are two basic embodiments of the present invention, as illustrated in FIGS. 1A and 1B. FIG. 1A illustrates a preferred system (100) that is configured to meet the specifications of the United States Postal Service and comprises a means for weighing and depositing a letter and a separate means for weighing and depositing a package. As discussed below, the system (100) in FIG. 1A could be modified, for example, to include a single means for weighing and depositing both packages and letters. The system (100) in FIG. 1A may also include an external tracking bar code scanner (151). FIG. 1B illustrates an alternative system (101) comprising an internal tracking bar code verification system for letters. System (101) in FIG. 1B could also be modified, for example, to include a separate weighing means for a letter. Similarly, system (100) in FIG. 1A could be modified to include an internal tracking bar code verification system, as well. Consequently, the following description of the aspects of the inventive system applies to both inventive mailing systems (100, 101) as illustrated in FIGS. 1A and 1B.

Figure 7:
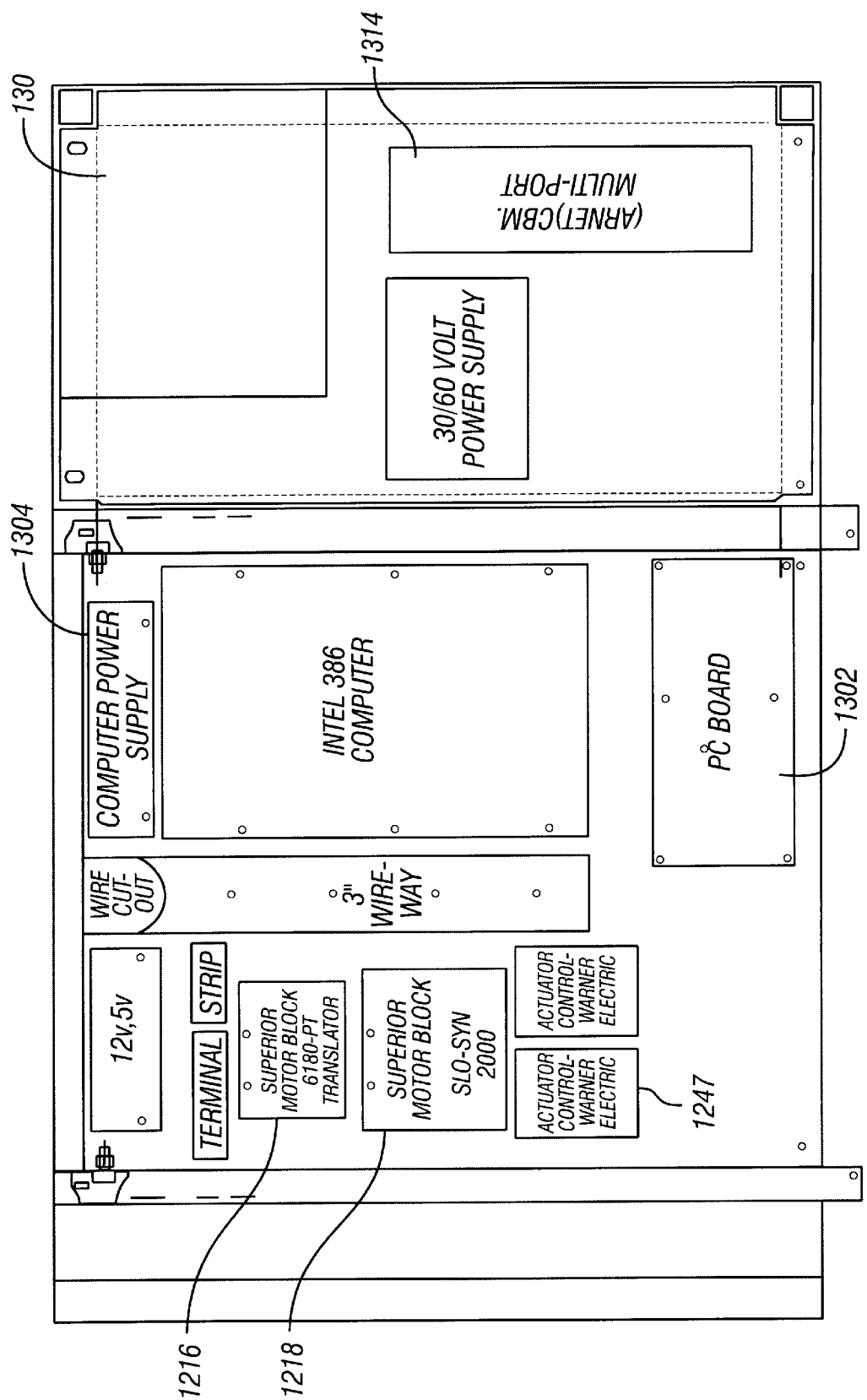
FIG. 7 is a layout of the electronic hardware at the upper computer tray.
Figure 8A:
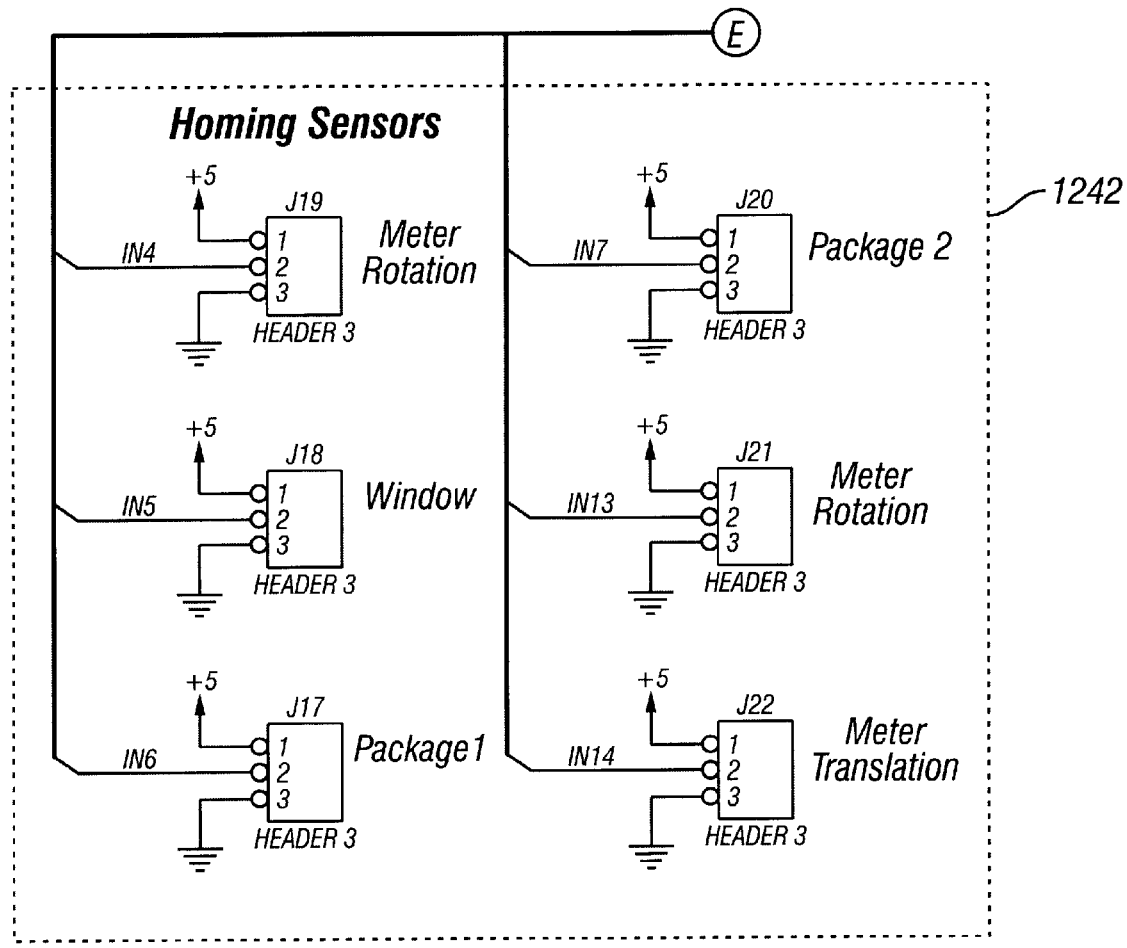
FIGS. 8A–8C are electrical schematic diagrams.
Figure 8B:
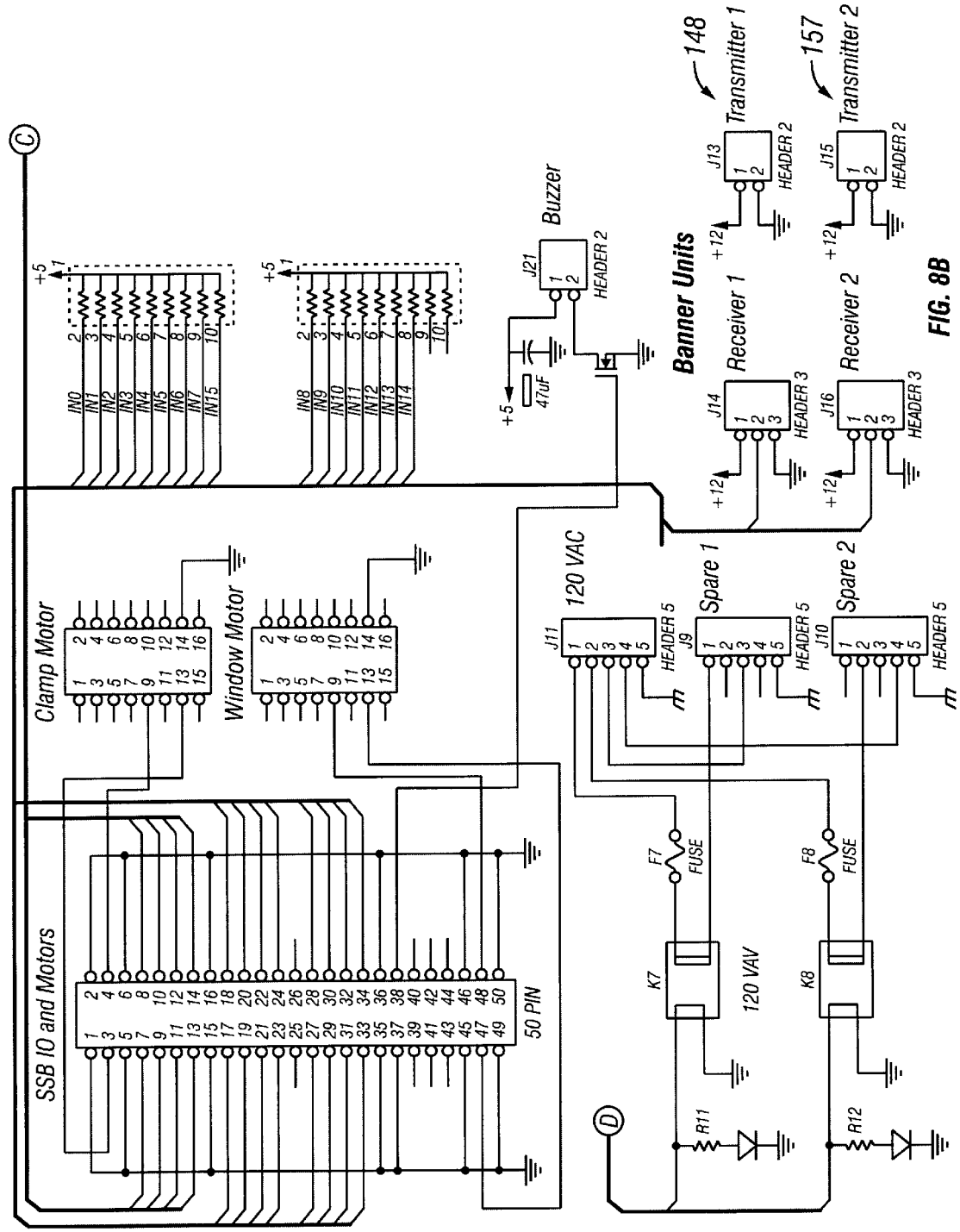
Figure 8C:
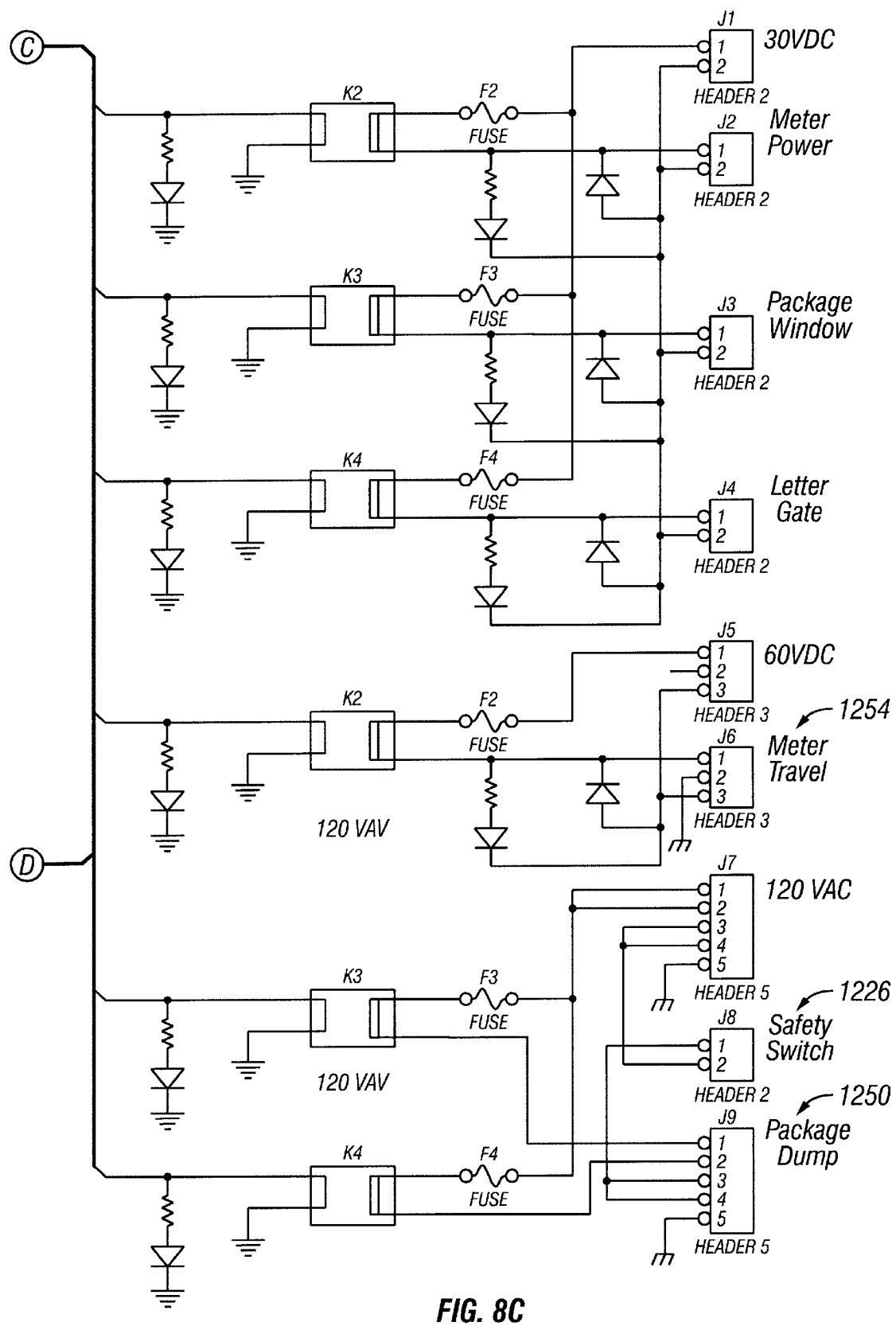
Figure 9:
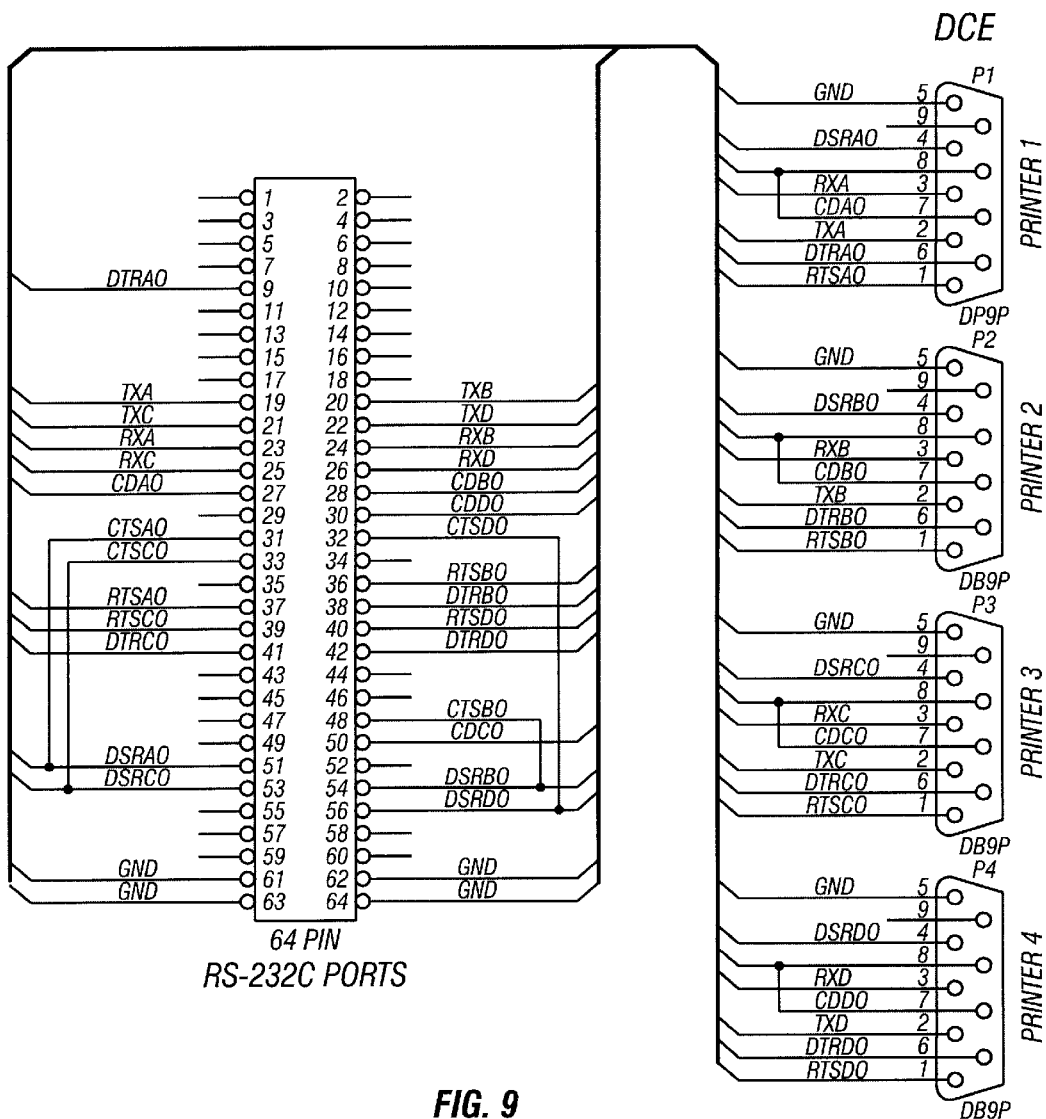
FIG. 9 is a schematic diagram of the multiport card.

The mailing system of the present invention is completely controlled via a computer (1308), as shown in FIG. 7, and a user-friendly, software program as illustrated in the flow charts (FIGS. 11A–11B, 12A–12B, 13A–13B, 14A–14B, 15, 16A–16B, 17A–17B, and 18) and data flow diagrams (FIGS. 19–23). Preferably, an I.B.M. compatible computer using an Intel 386 for the CPU, having a minimum 33 HZ clock speed, is employed. The inventive software is further defined by its source code, which is provided in the attached microfiche Appendix A.

Figure 19:
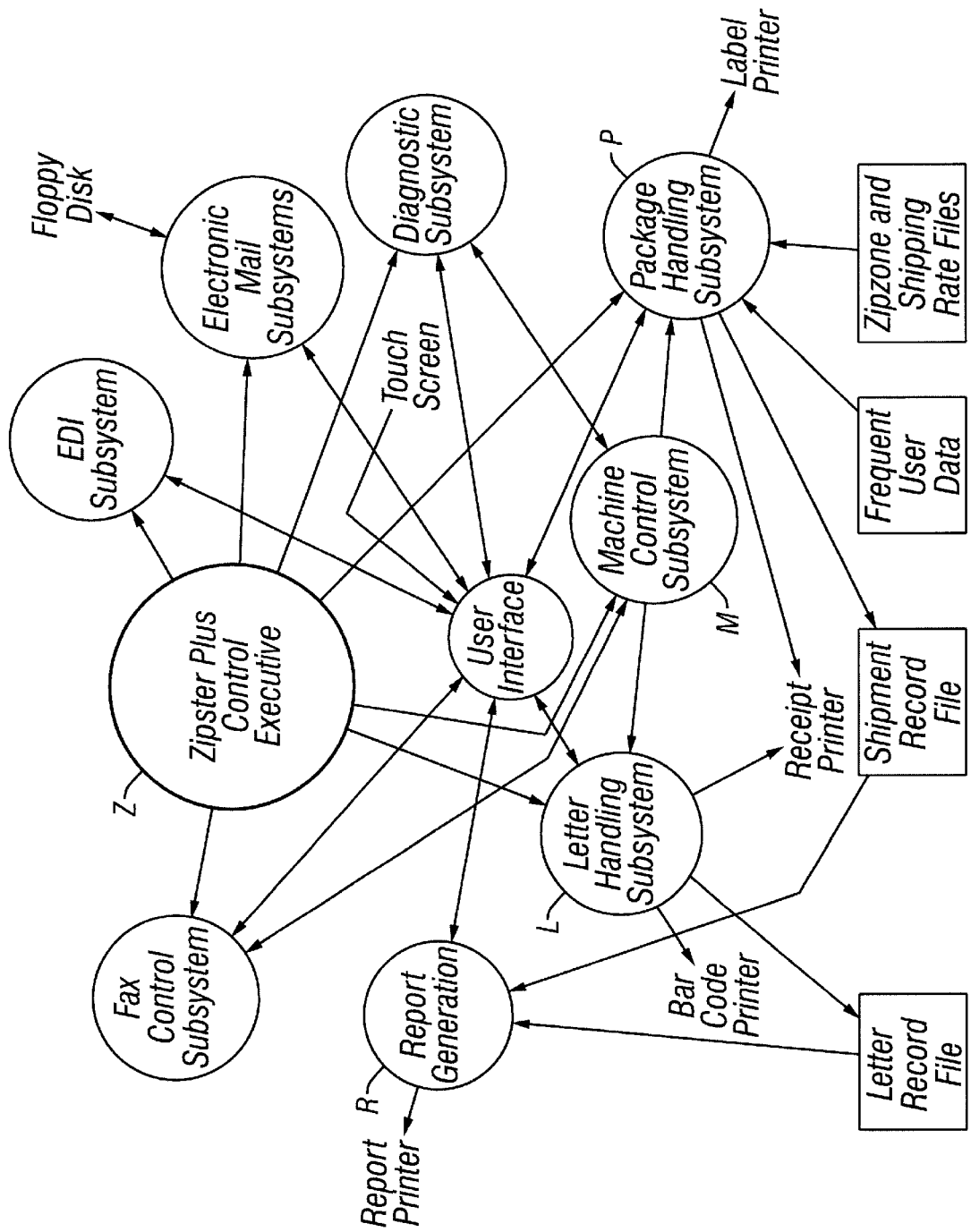
FIGS. 19–23 are data flow diagrams showing the interaction between the inventive system and the software as disclosed in the present invention.
Figure 20:
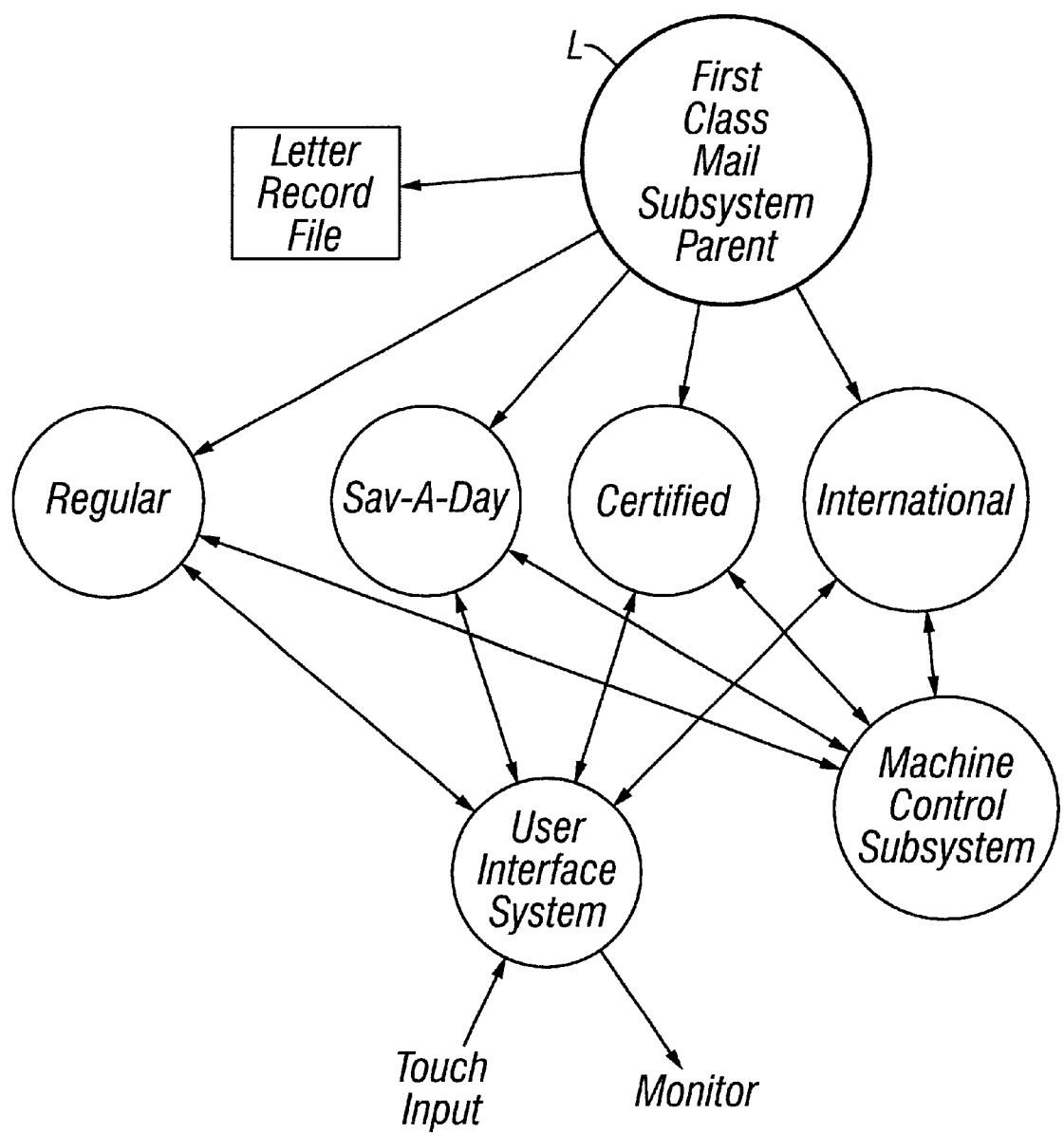
Figure 21:
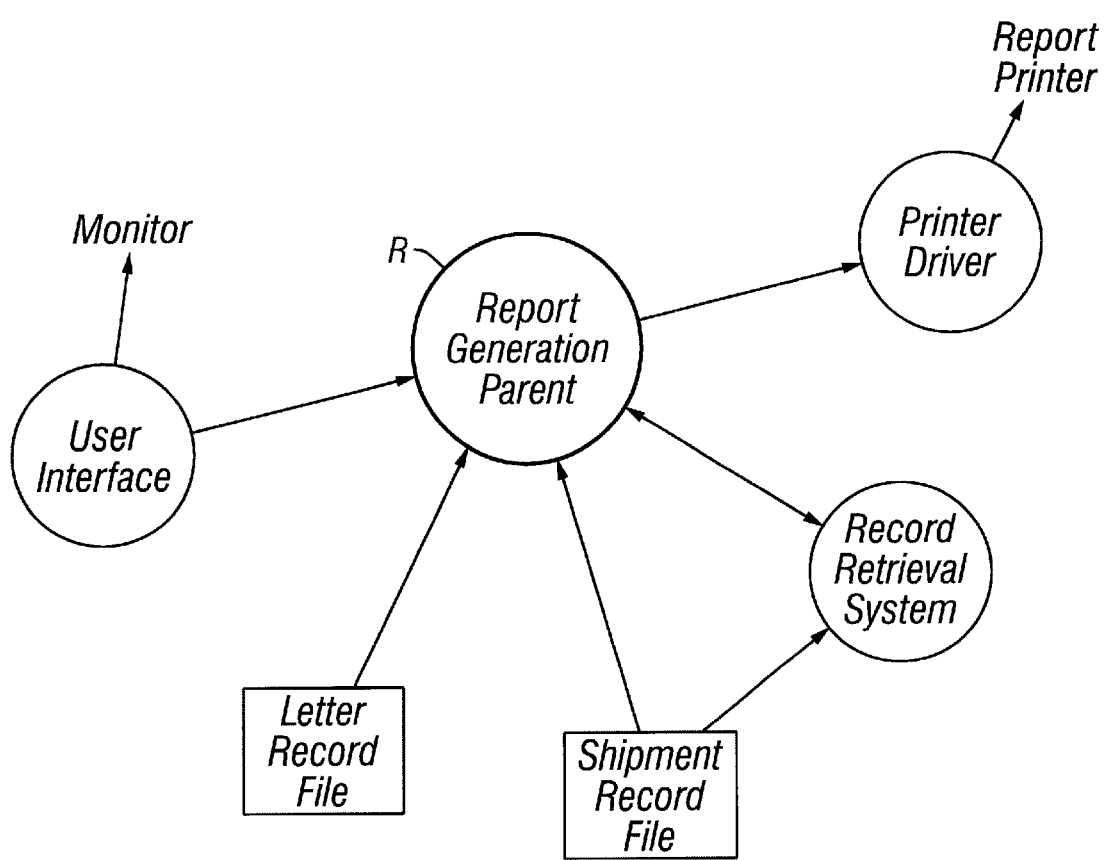
Figure 22:
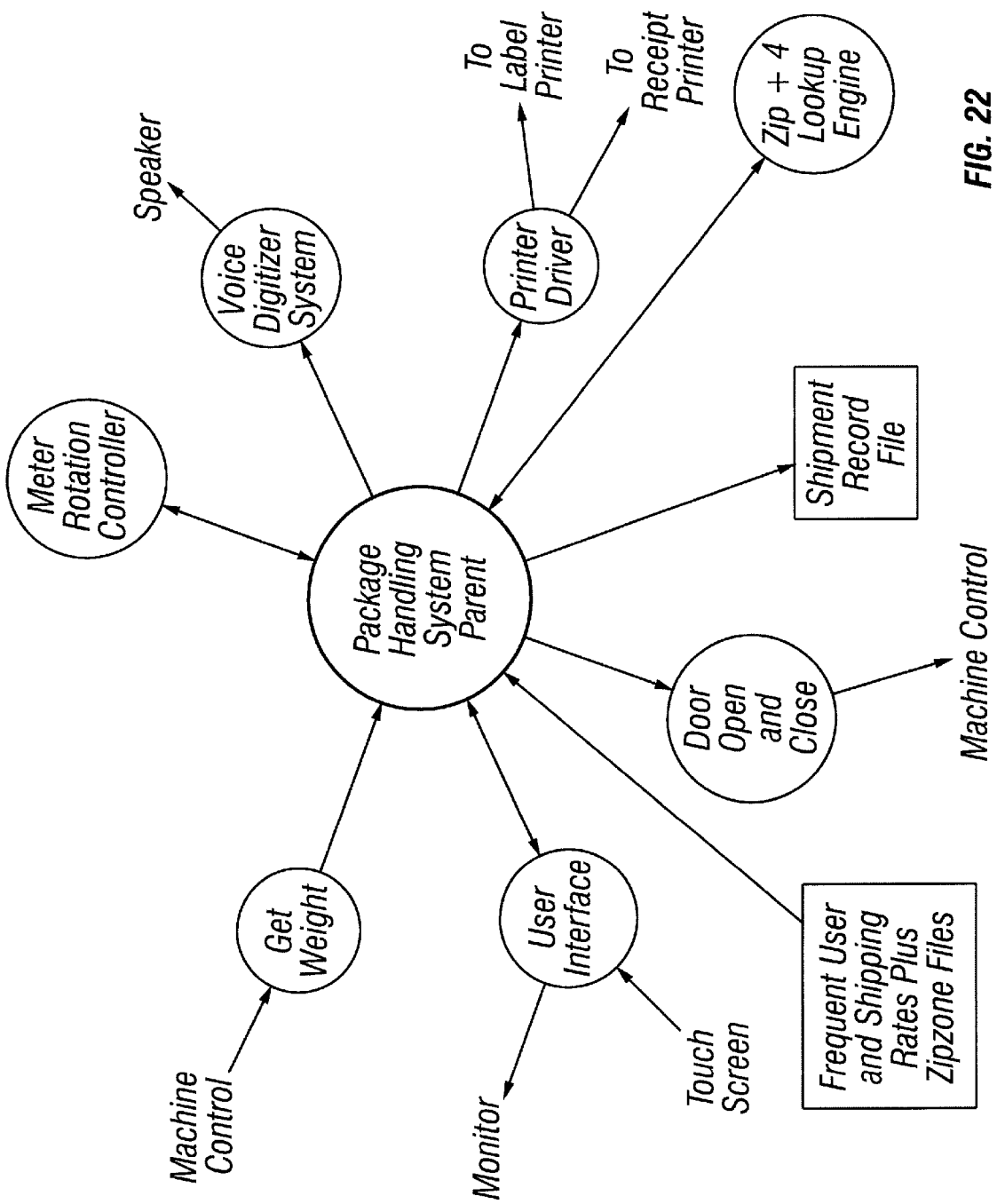
Figure 23:
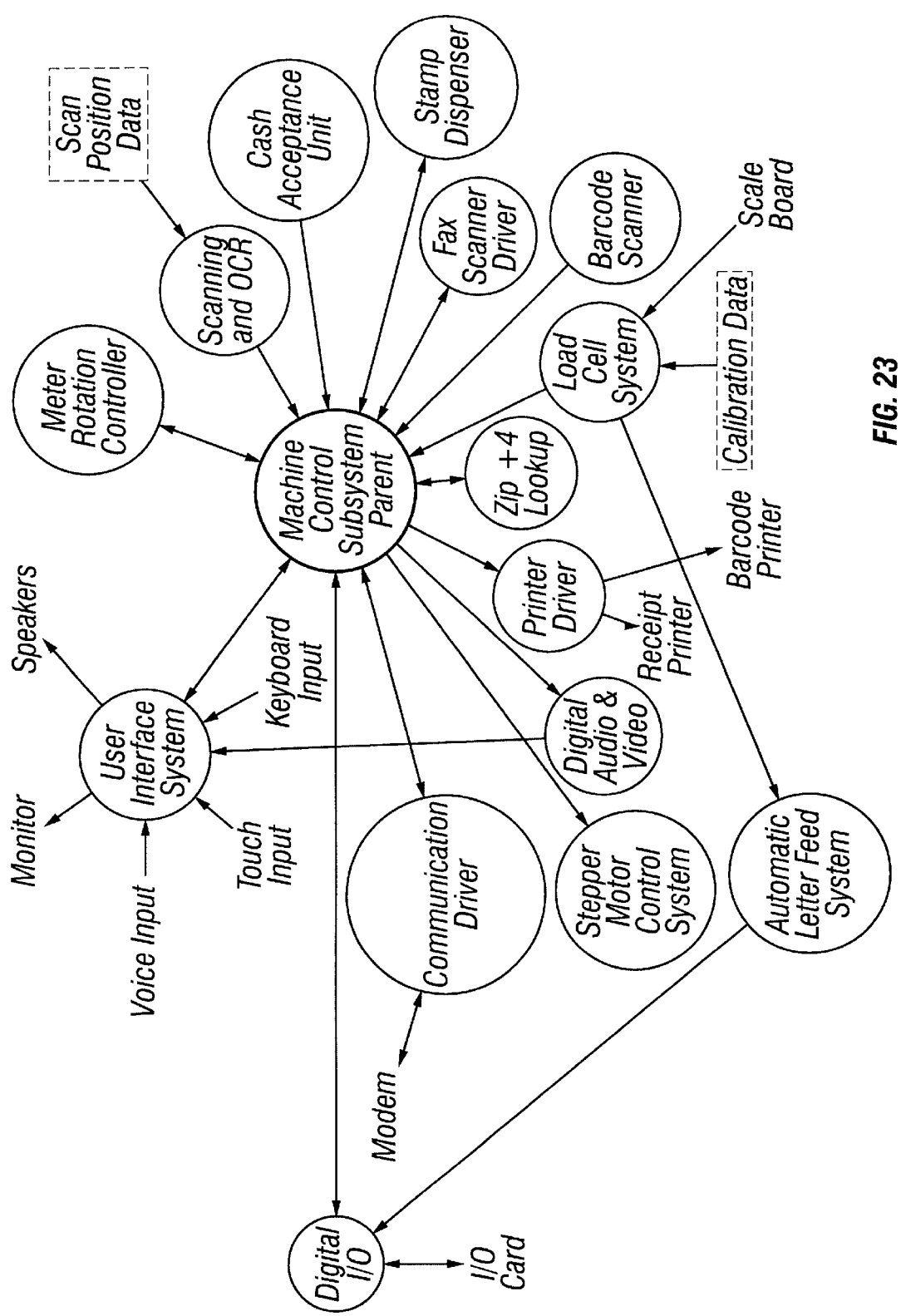

The data flow diagram illustrated in FIG. 19 depicts the overall flow of data among various software subsystems and the control executive (Z) present in the inventive mailing system. Specifically, FIGS. 20, 21, 22, and 23 further illustrate the flow of data to and from the letter handling subsystem (L), report generation subsystem (R), package handling system (P), and the machine control subsystem (M), respectively, within the system.

Figure 4:
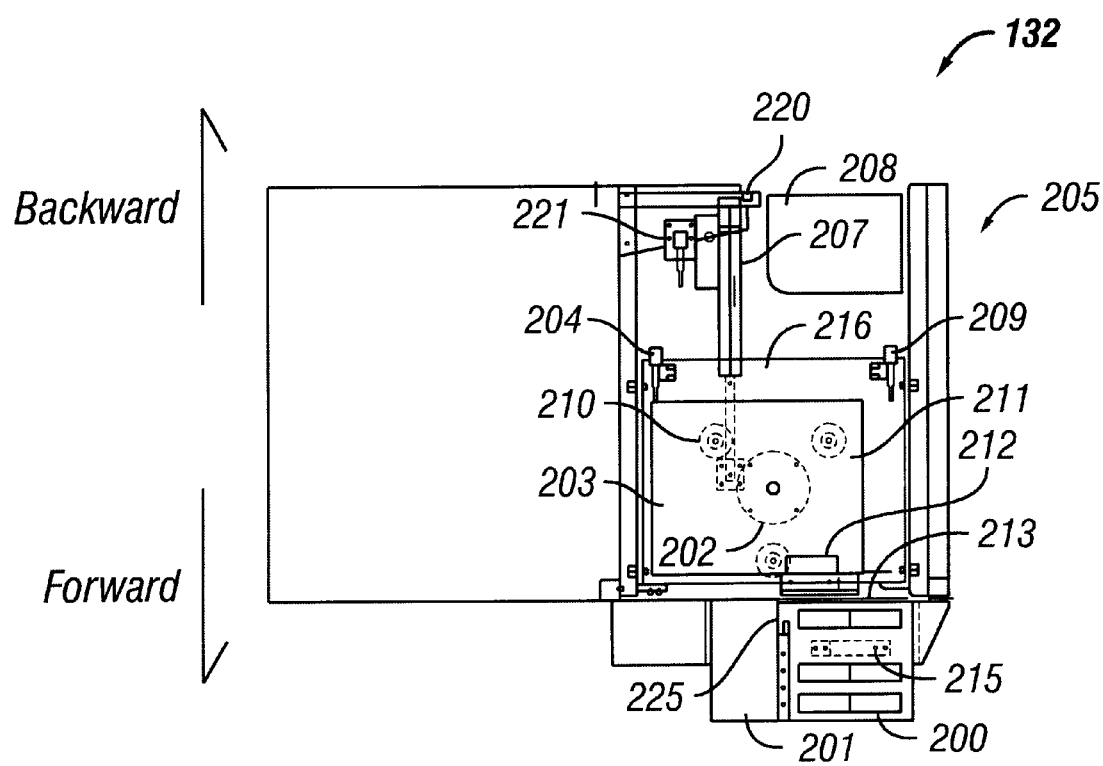
FIG. 4 is a top view of the inventive system's rotatable postage meter at elevation +40.00.

Referring now to FIGS. 1A and 1B, the mailing system (100, 101) comprises an outer housing having a front side (102a), a back side (102b), a left side (102c) and a right side (102d), wherein preferably the right side of the housing (102d), for example, is set up for processing and storing letters and the left side (102c), for example, is configured to process and store packages. Alternatively, the system (100, 101) could be configured to have only the features of the left side (102d) where both letters and packages could be processed and stored together, as discussed in more detail below. Some preferred basic features of the inventive mailing system (100) as shown in FIG. 1A include a display means, more preferably a touch-screen activated monitor (110), a magnetic user identification card reader (122), a transaction receipt printer (128) and a package label printer (142), an internal letter handling mechanism (132), a letter platform (150) comprising, as shown in FIG. 4, a postage meter strip plate (201) and a letter weighing scale comprising a weigh plate (200) and a load cell (215) contained within the platform, an outer letter security door (213), a secured item acceptance area (106) comprising an outer security door (108), and preferably a lefthand outer system door (160) and a right-hand outer system door (161) for allowing access into the system by authorized personnel, including a lock mechanism (154) for preventing access into the mailing system by unauthorized individuals.

Figure 10:
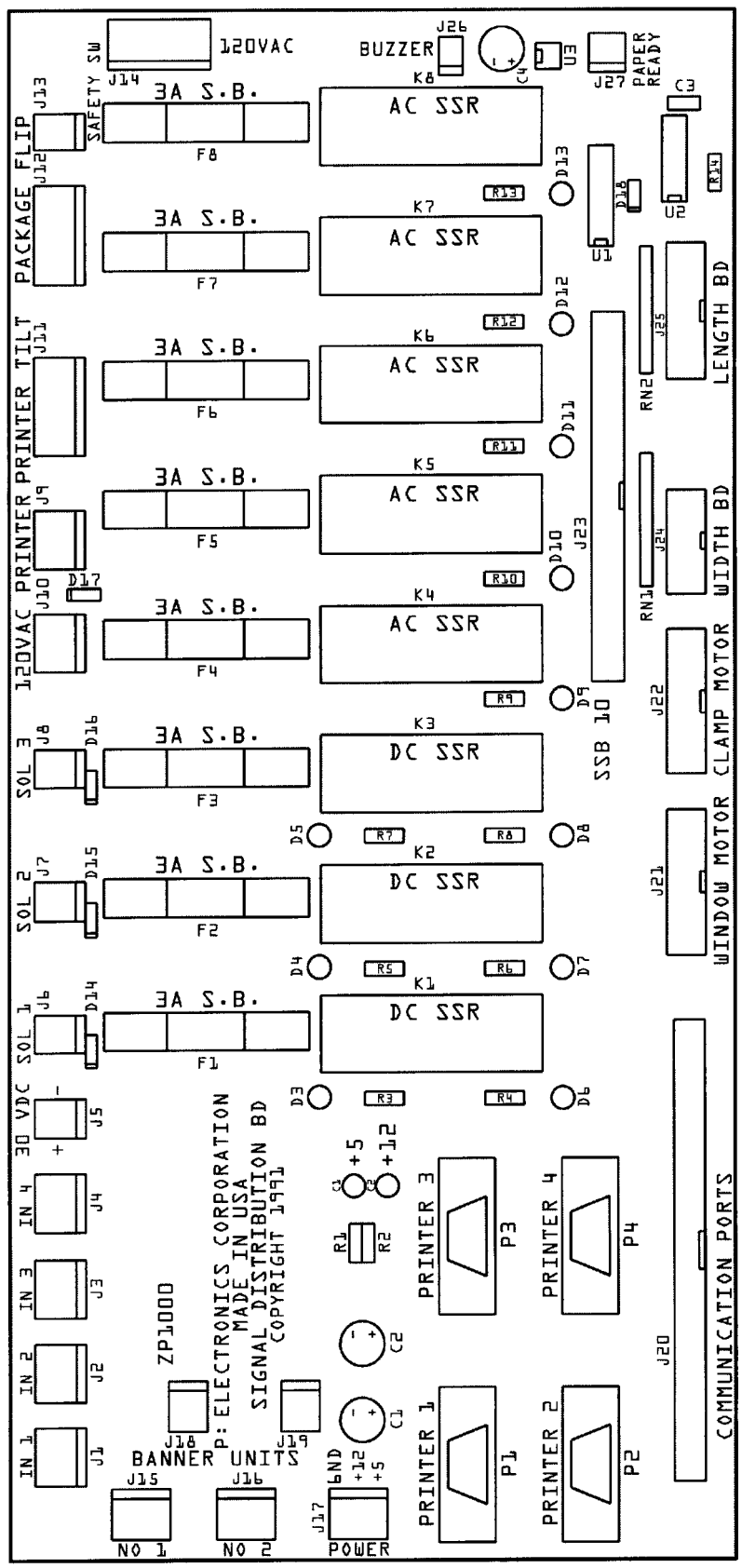
FIG. 10 is a layout of the distribution PC board.
Figure 11A:
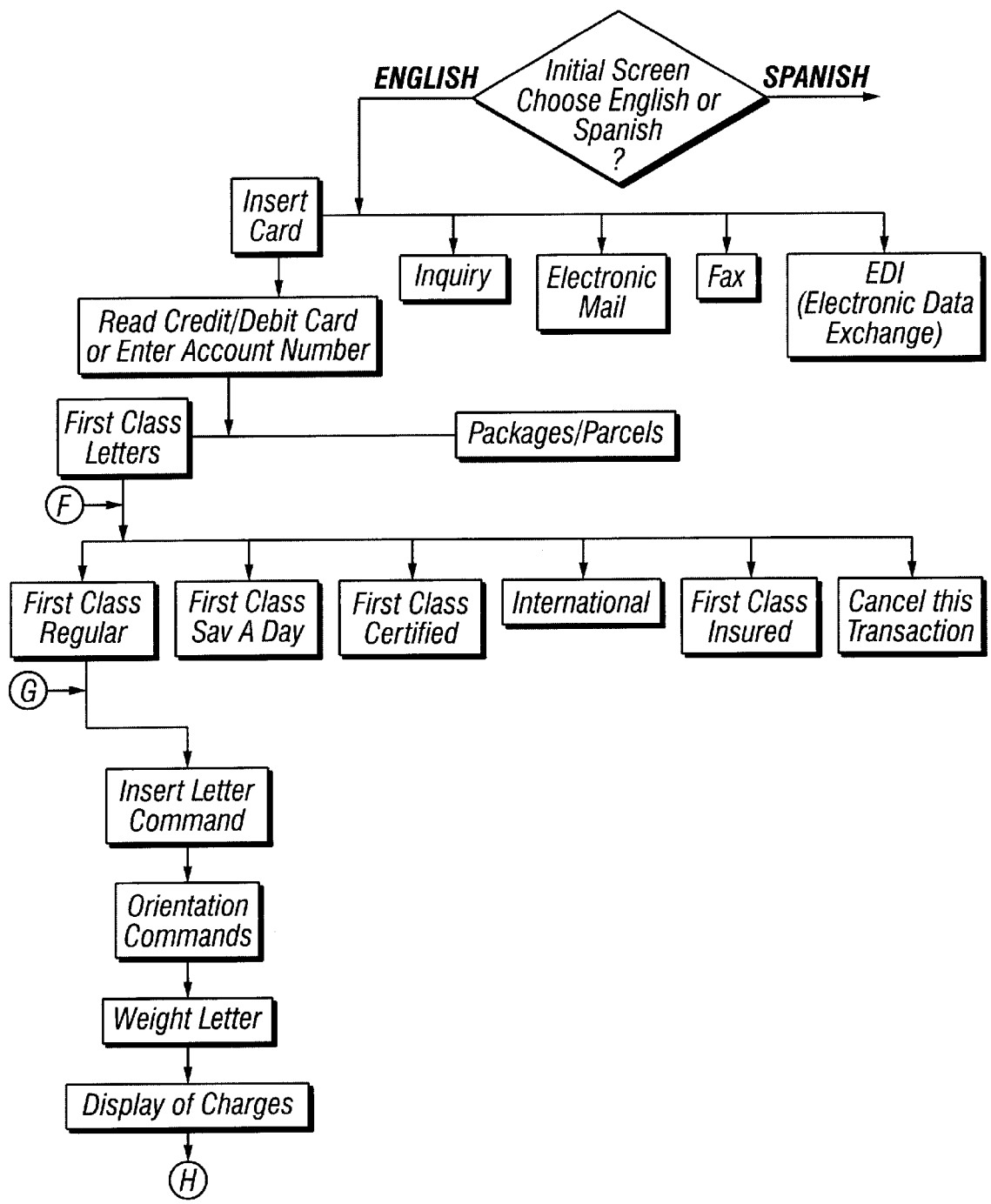
FIGS. 11A–11B and 12A–12B are now charts illustrating the processing of a regular first class letter.
Figure 11B:
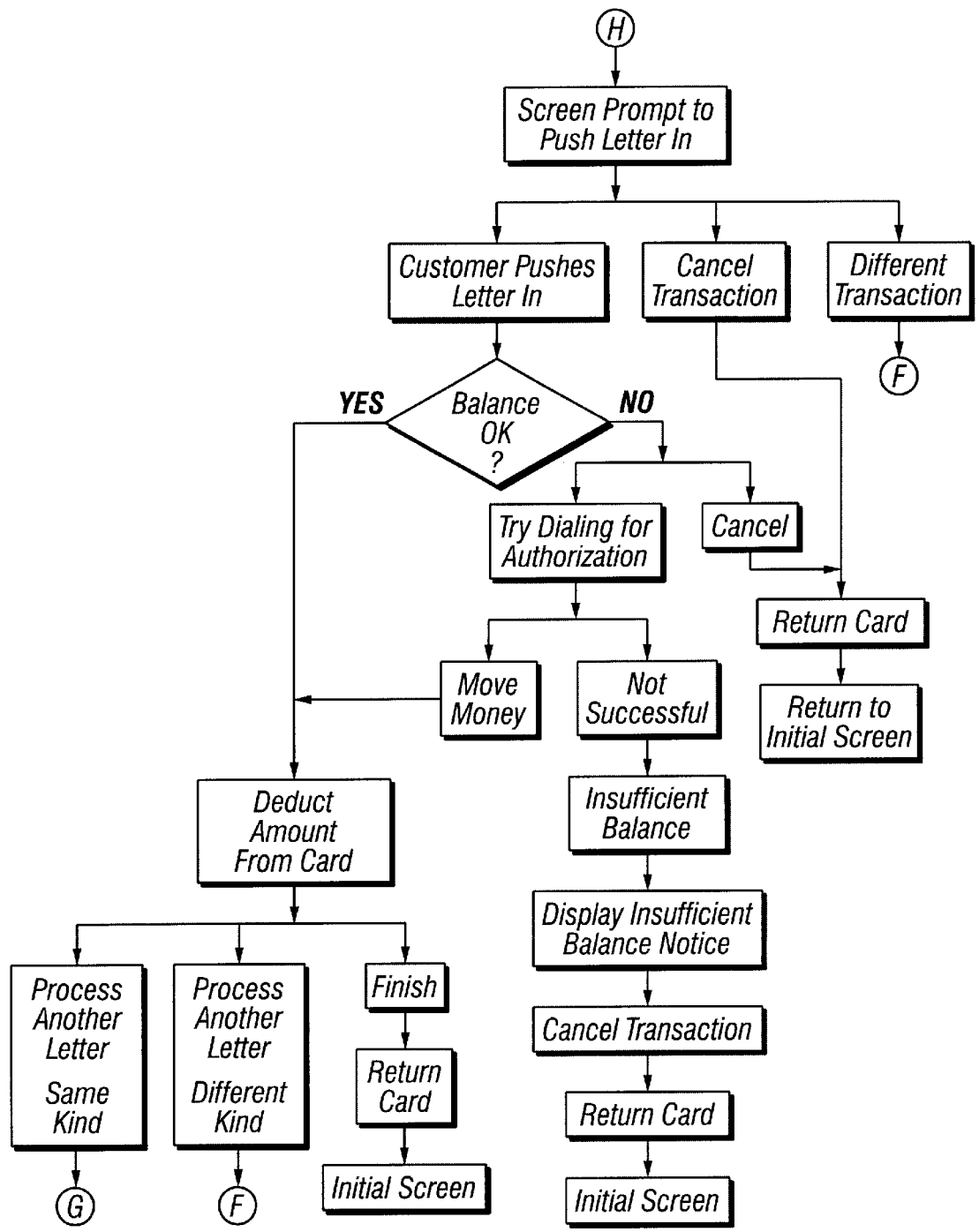
Figure 12A:
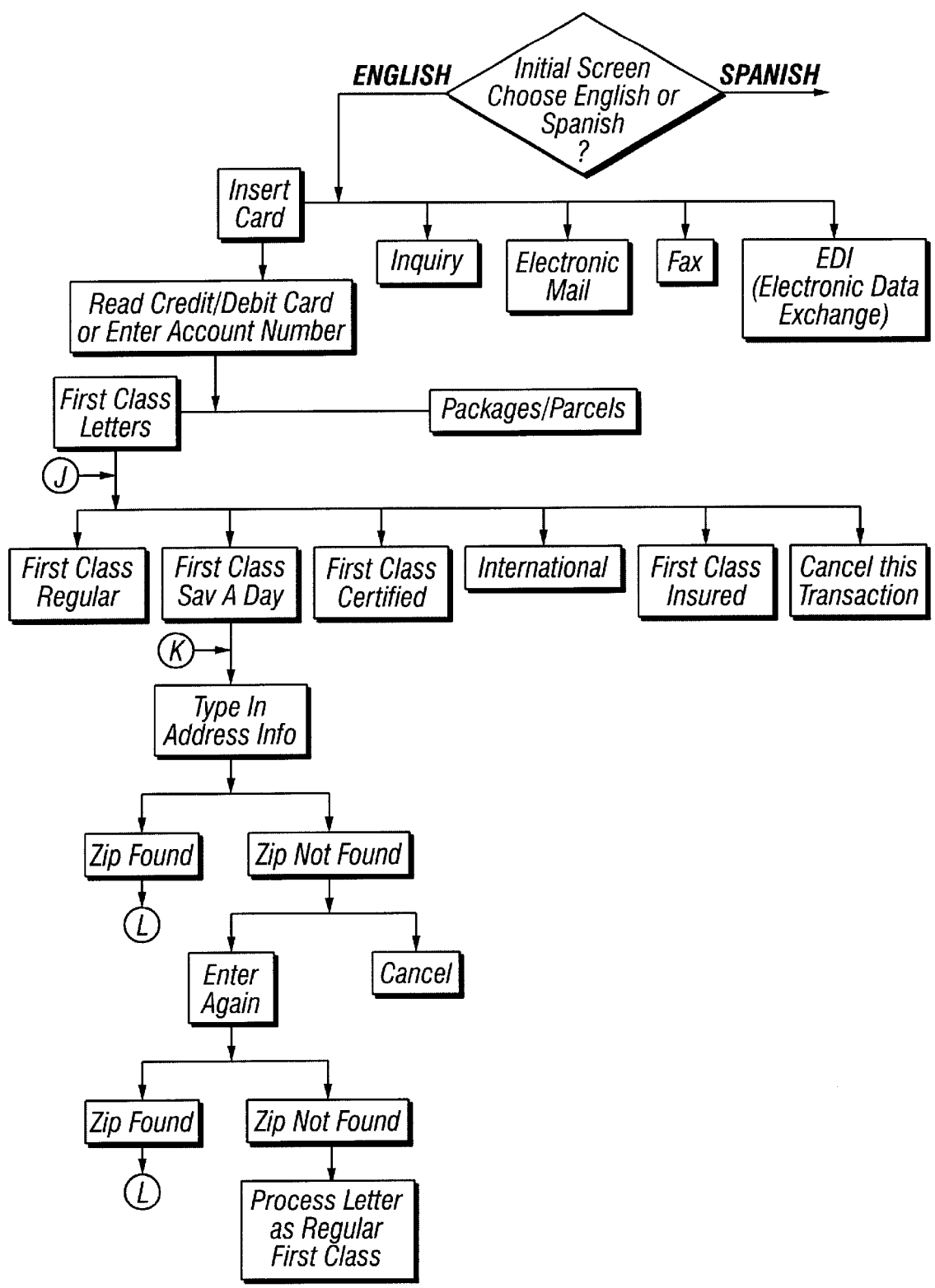
Figure 12B:
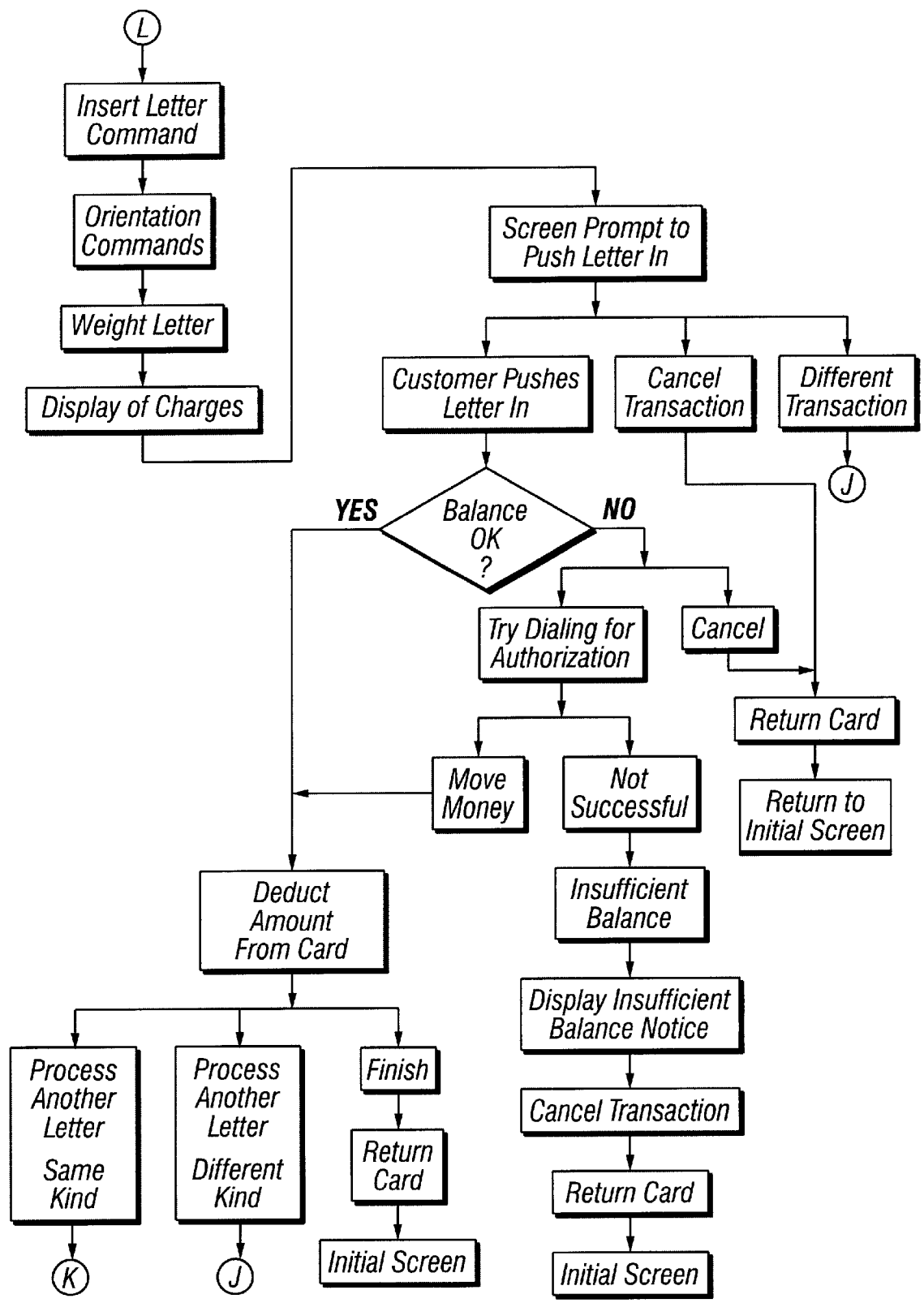
Figure 13A:
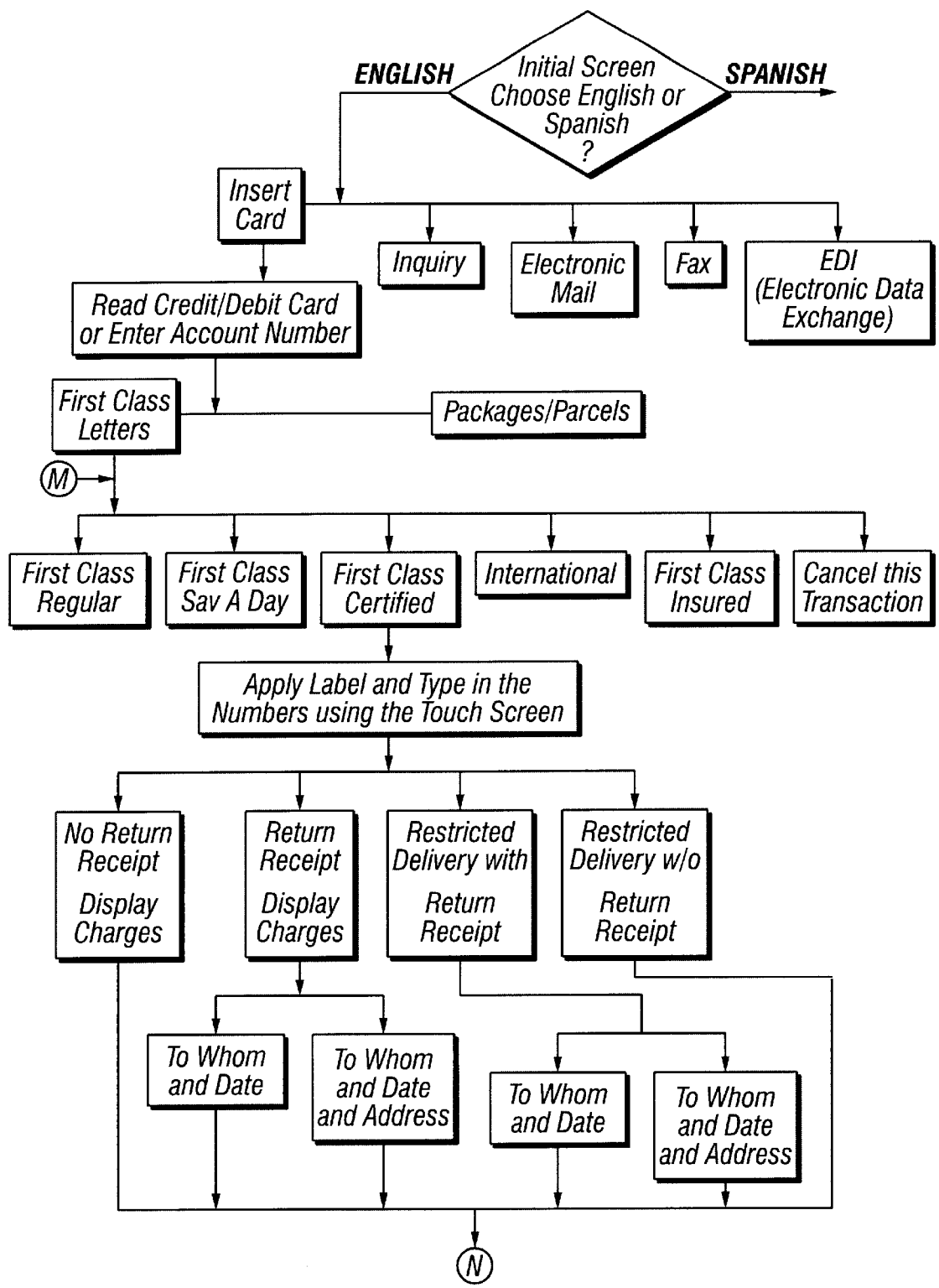
FIGS. 13A–13B are flow charts illustrating the processing of a first class certified letter.
Figure 13B:
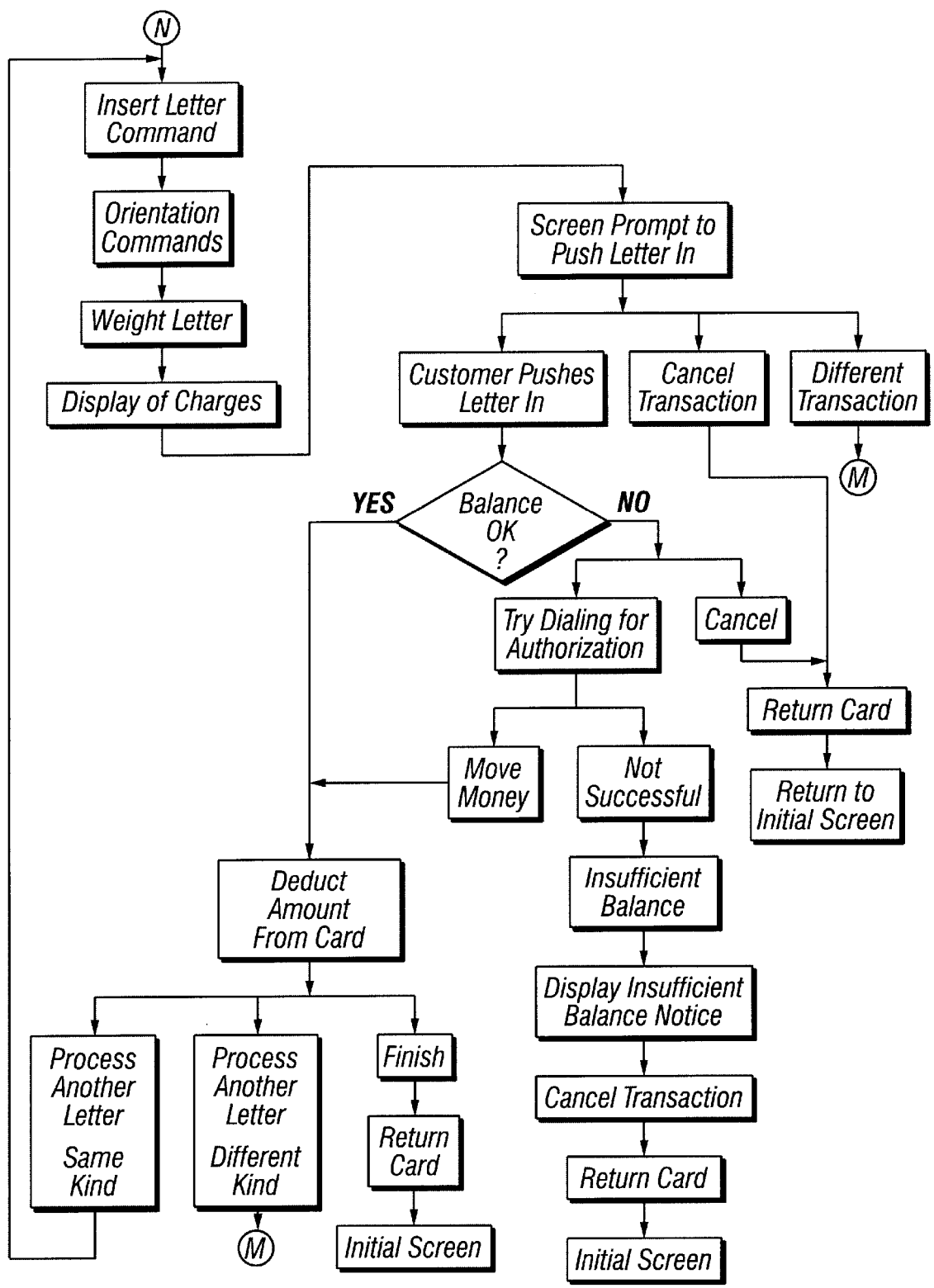
Figure 14A:
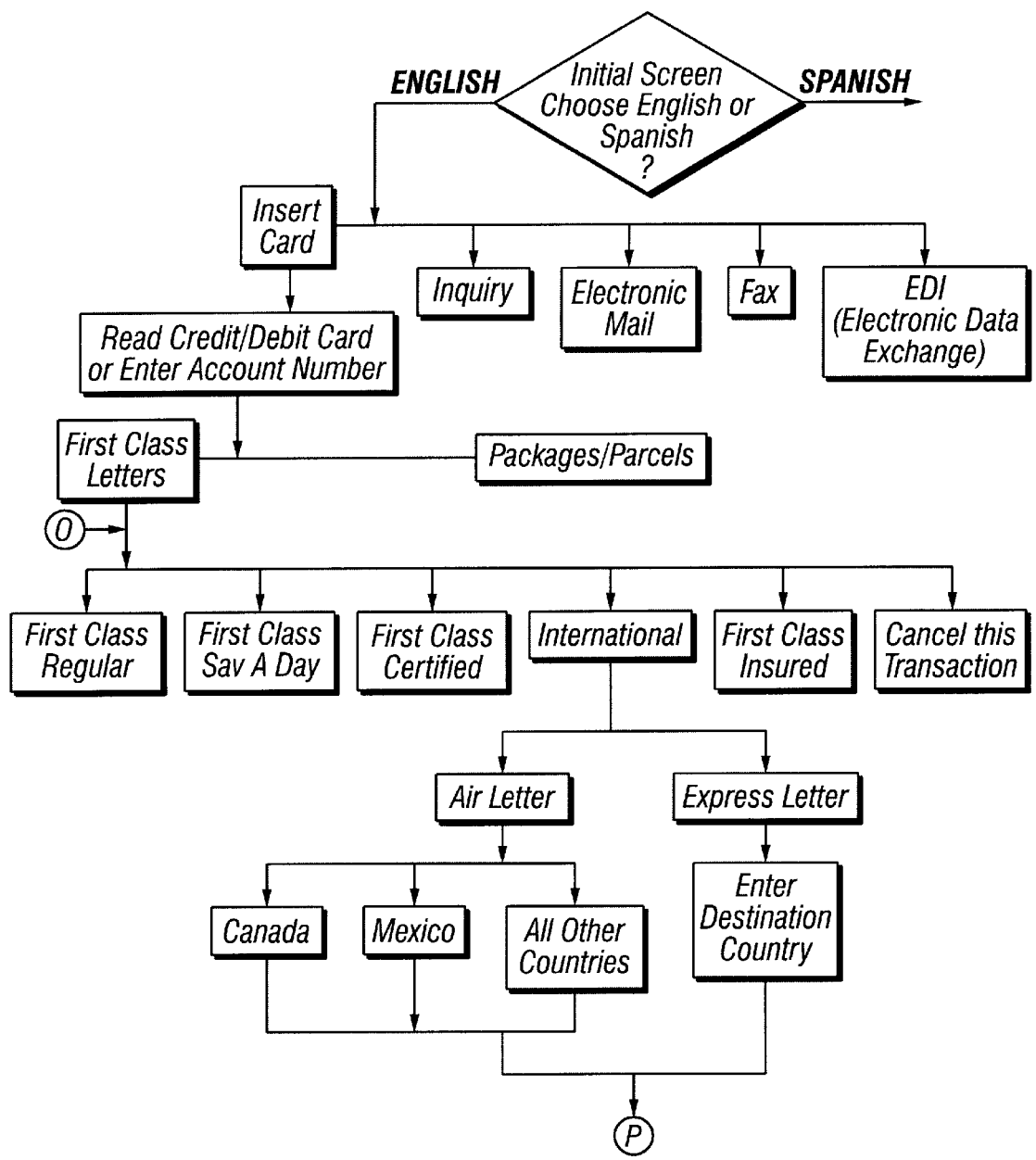
FIGS. 14A–14B are flow charts illustrating the processing of a first class international letter.
Figure 14B:
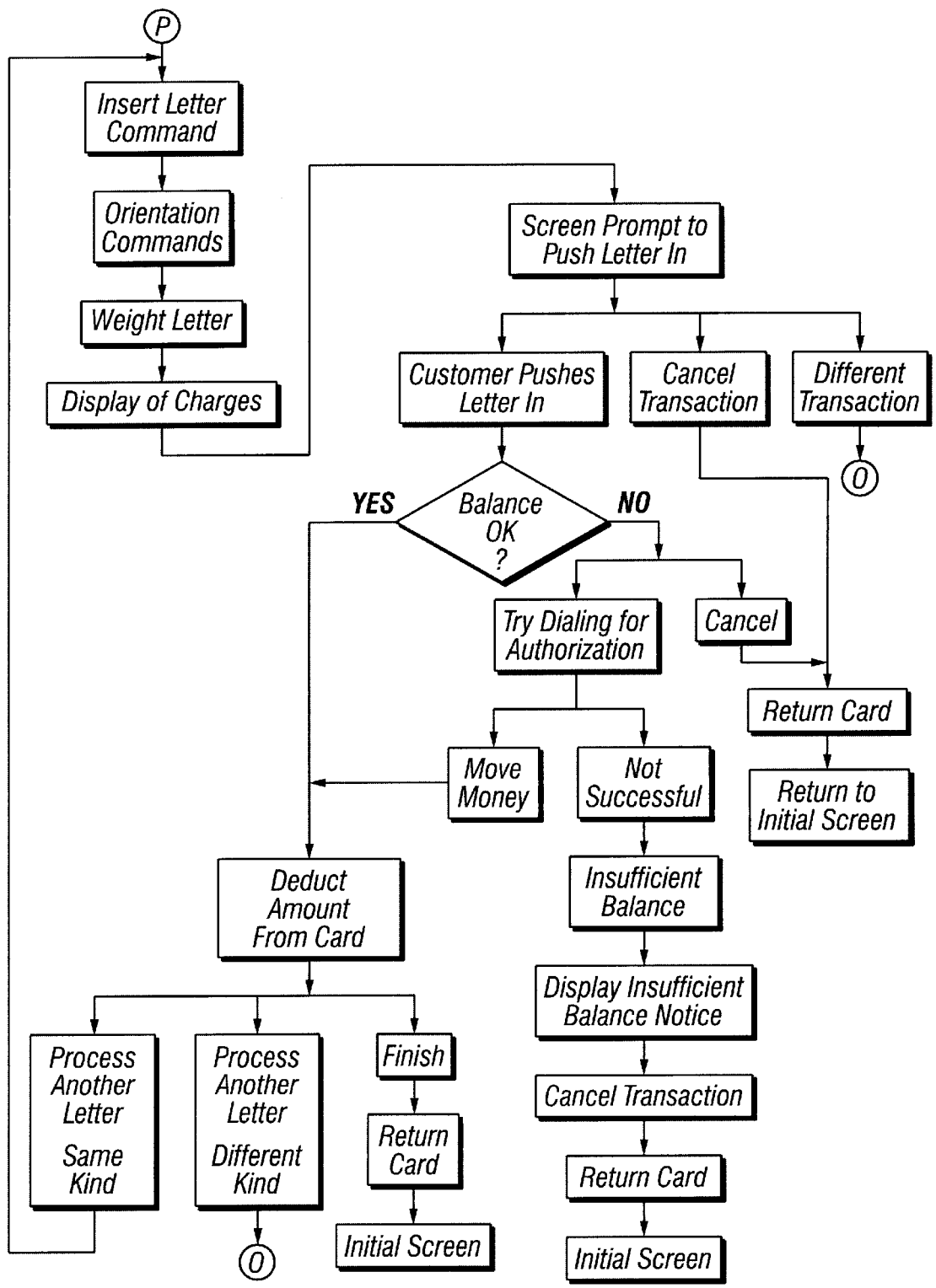
Figure 15:
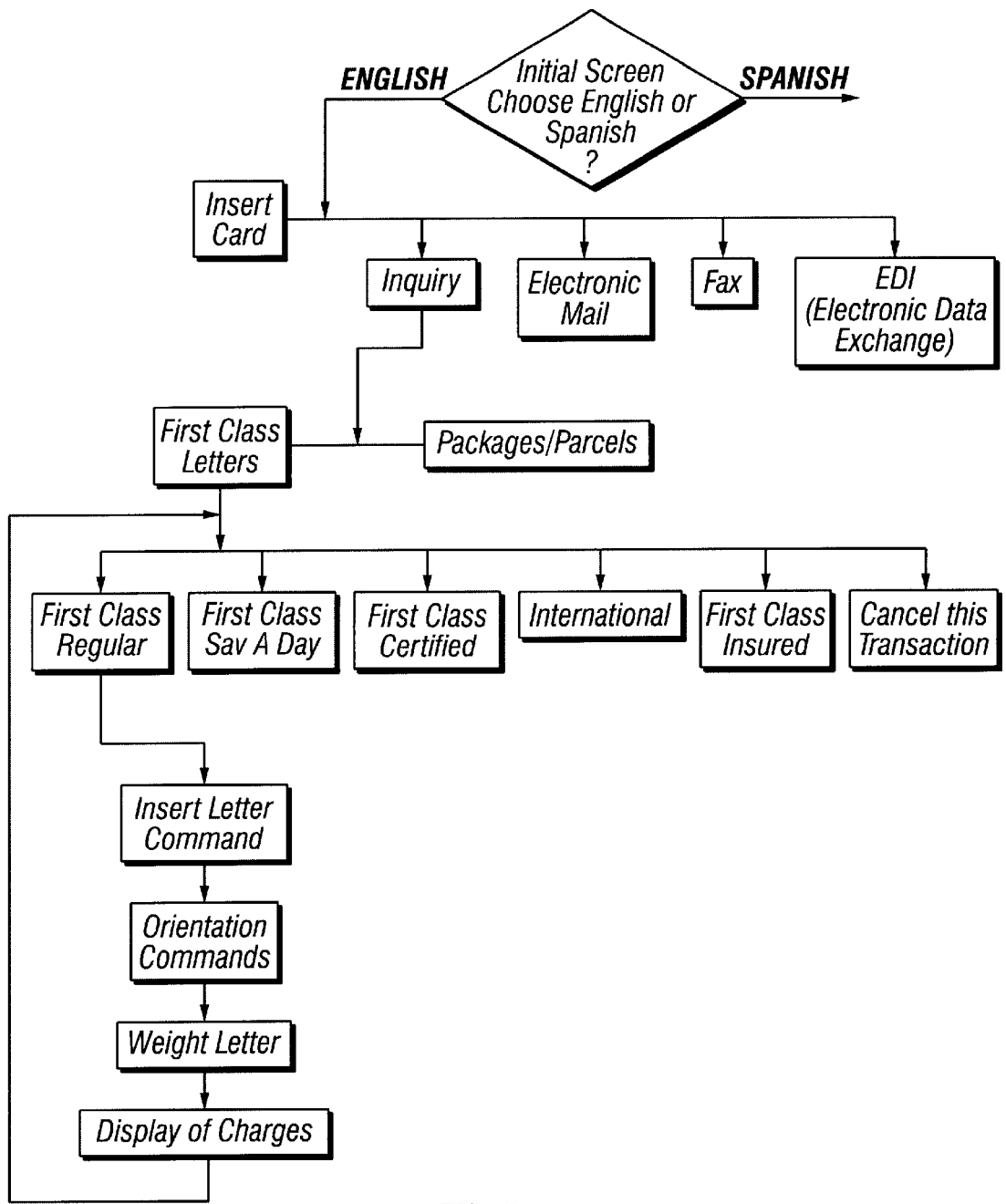
FIG. 15 is a flow chart illustrating the customer inquiry process for a letter.

The system also comprises an electronic sliding tray (130) containing the computer (1308) and other electronic features of the system, including for example, the computer power supply (1304), the serial multi-port expansion strip (1314), stepping motor power supplies (1216, 1218), and the PC distribution board (1302) as shown in FIG. 7. FIG. 10 illustrates the PC distribution board (1302) shown in FIG. 7. FIGS. 8A, 8B, 8C, and 9 illustrate the electrical schematics of the distribution board (1302), including the operation of different homing sensor devices (1242) (FIG. 8A) which inform the computer that the different devices in the machine are at their home position (e.g. postage meter rotation, discussed below); different pin connections (FIG. 8B) on the motor controller card/IO card that further input to the computer information from the banner units (148, 157); relays which operate the postage meter travel (1254), safety switch (1226), and package dump (1250) devices shown in FIG. 8C; and the RS232C controller card that controls various printers shown in FIG. 9. Other features of the inventive mailing system, both internal and external, as well as alternative embodiments of the present invention will be discussed in more detail below in the description of the operation of the inventive mailing system.

The inventive mailing system is designed to process and store letters and packages for subsequent shipment and operates by electronically interacting with a user via an inventive, user-friendly, software program. Referring again to FIGS. 1A and 1B, the mailing system (100,101) preferably includes a computer monitor (110) which displays a continuous video demonstration on how to operate the mailing system. The video demonstration is preferably stored on a CD Rom video unit (147) which is connected to the computer (1308) via an analog to digital video card. Other suitable video devices, such as a computer-controlled VHS video cassette system as well as other computer-controlled video systems may be employed.

To perform a mailing transaction, the user will interact with a communication means which is mounted on the outer housing. A more preferred communication means is a display means, most preferably a computer monitor (110) equipped with a touch-sensitive screen with which the user interacts to input requested information for processing a mail item. The screen may be a conventional touch-screen activated by infraray, sonic waves, or resistance screen. While the operation of the present inventive mailing system will be described with reference to the touch-screen activated computer monitor (110), which is the most preferred type, other types of communication means are contemplated within the scope of the present invention, and thus may be employed. For example, a conventional computer monitor may be employed that is coupled with an alphanumeric key pad or keyboard. In this latter embodiment, the user inputs information into the mailing system via the key pad or key board. Alternatively, the communication means may be a voice-activated system, such as a digitized voice recognition system for receiving user input, such as that manufactured by Dragon Systems, for example, whereby the mailing system, via the software and computer (1308), operates in response to the user's spoken commands. In this third embodiment, the communication means may utilize a display means such as a computer monitor for providing instructional information visually to a user, or it may provide such information to a user by an audio means such as a digitized voice system, for example.

To initiate a mailing transaction, the user approaches the mailing system (100, 101) and touches the screen to cause the screen, or a digitized voice recognition system through microphone (112), and/or video instruefion on touch-screen (110) to be activated which will in turn instruct the user to perform the next step in the operation. Following the flow diagrams illustrated in FIGS. 11A–11B, 12A–12B, 13A–3B, 14A–14B, 15, 16A–16B, 17A–17B, and 18, the user selects a language for conducting the transaction, such as English or Spanish, for example. The user is then requested to enter a means for payment, most preferably user identification information for the purpose of payment, preferably by swiping or inserting a user identification data entry means such as a magnetic credit/debit card, through or into a magnetic card reader (122). Alternatively, the user could be instructed to input a user identification code, such as a personal identification number (PIN) and/or an account number, for example, via the touch-screen or a key pad/keyboard mechanism, for example. It is contemplated that the inventive system could be modified by one of skill in the art, having the benefit of the invention's teachings and suggestions, to accept payment in the form of cash (i.e. coins and/or bills) after the total charge has been determined. Once the computer (1308) identifies the correct information from the credit/debit card, for example, it will transmit this information via a modem (1262) and telephone line (1264) (FIG. 6C) to an external credit/debit authorization center. Once the authorization is obtained, the software program will automatically activate the next screen which will request the user to make a selection between various services offered through the commercial carrier. The software flow diagrams illustrated in FIG. FIGS. 11A–11B, 12A–12B, 13A–13B , 14A–14B, 15, 16A–16B, 17A–17B, and 18 depict services offered by the U.S.P.S.; however, the computer system may be programmed with additional and/or different mailing services unique to other commercial carriers (e.g. Federal Express Two-Day and Overnight). The remaining descriptions of the operation of the inventive mailing system,. including the FIGS. contained herein, will be for a mailing system designed for shipping by the United States Postal Service (FIG. 1A for example) or the United Parcel Service (FIG. 1B, for example).

Preferably, the inventive mailing system (100), such as that configured per U.S.P.S. specifications and requirements, will allow a user to process a letter for a particular type of first class delivery. The process for mailing packages is discussed later. Referring now to the figures, in particular FIGS. 1A, 4, 4A–4E, 6A–6C and 11A–11B, 12A–12B, 13A–13B, 14A–14B, 15, 16A–16B, 17A–17B, and 18, the user requested to make a mail service selection. To process and mail a letter first class, for example, the user selects one of the First Class services (e.g. First Class Regular). The following figures illustrate the flow diagrams for processing a letter First Class: FIGS. 11A–11B, 12A–12B, 13A–13B, 14A–14b, 15, 16A–16B, 17A–17B, and 18 (Regular), FIGS. 12A–12B ("Sav A Day"), FIGS. 13A–13B (Certified), and FIGS. 14A–14B (International) and FIG. 15 (Customer Inquiry, First Class Letter)

Figure 4A:
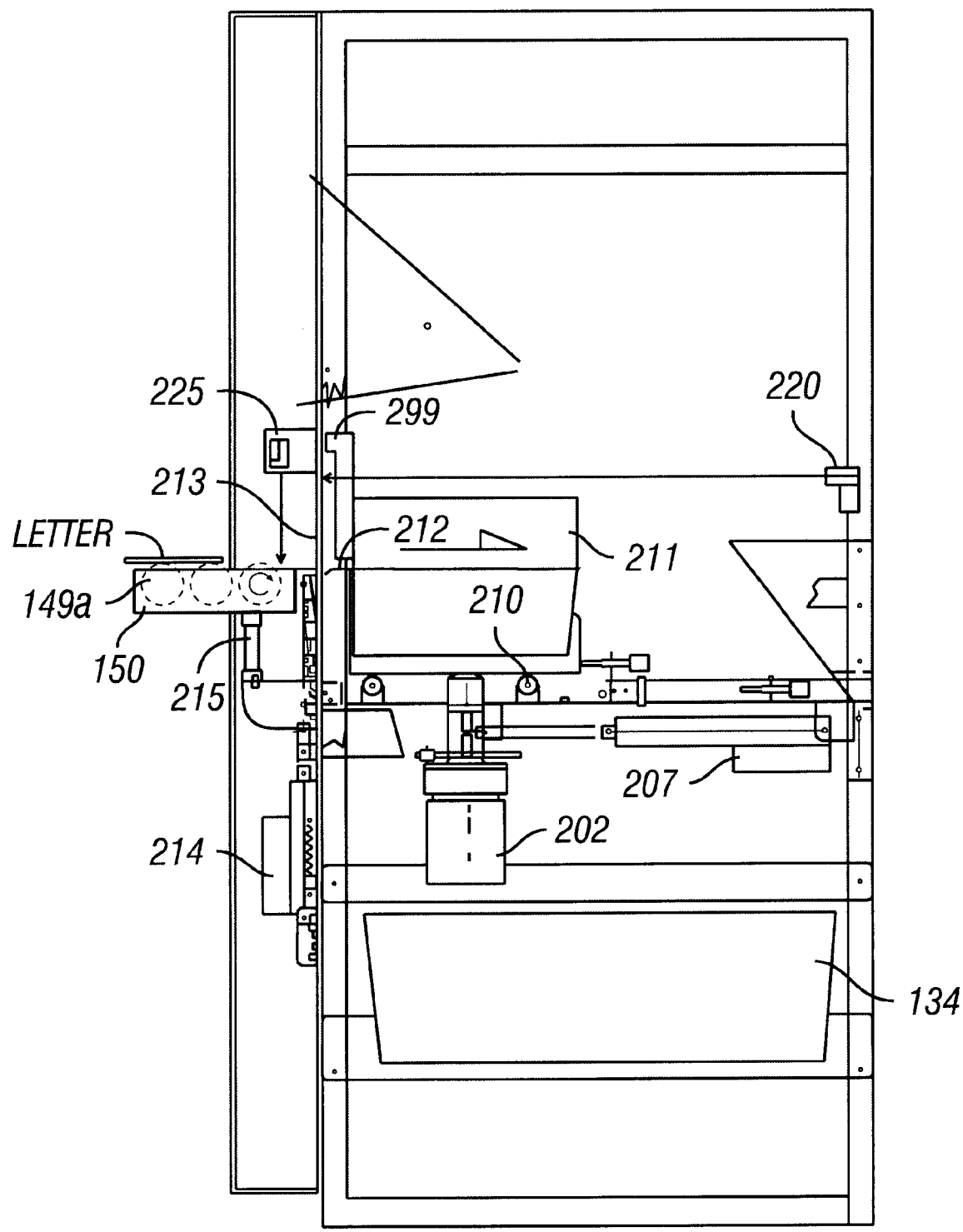
FIG. 4A is a side view of the letter handling mechanism comprising a postage meter and automatic feed means.
Figure 4B:
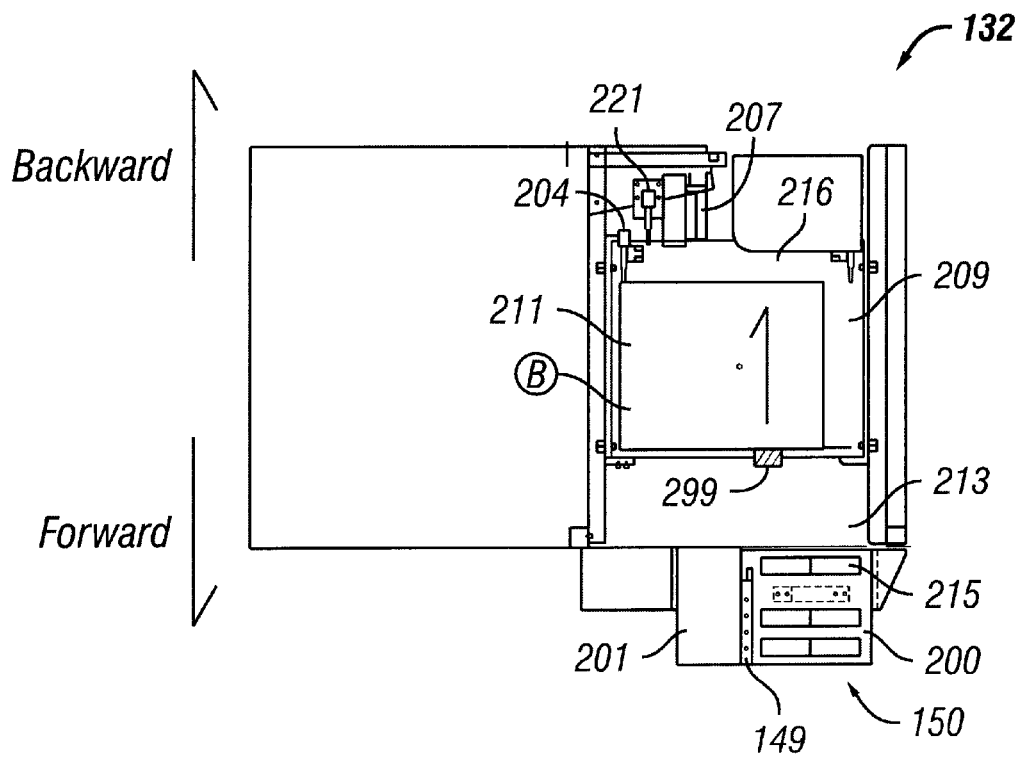
FIG. 4B is a top view of the inventive system's rotatable postage meter at elevation +40.00 showing the rotatable postage meter in the retracted, home position for printing a postage meter stamp onto a letter.
Figure 4C:
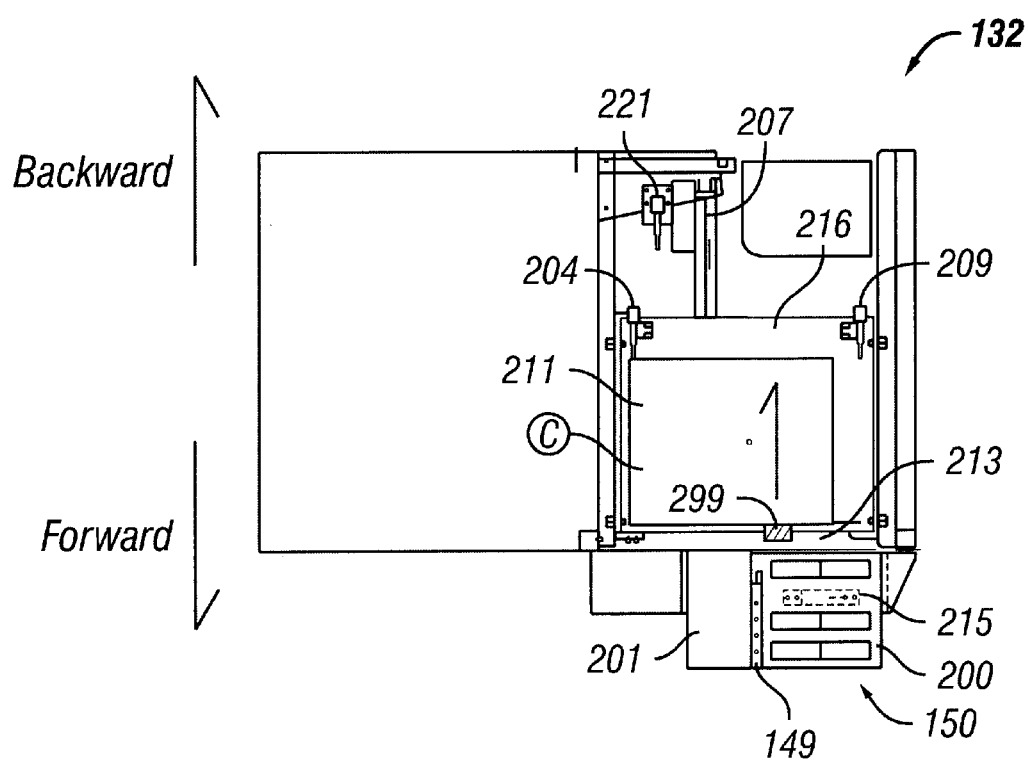
FIG. 4C is a top view of the inventive system's rotatable postage meter at elevation +40.00 showing the rotatable postage meter in the forward position and ready for printing a postage meter stamp onto a letter.

Next, a postage meter (211) is orientated into the correct position for generating a postage meter stamp or strip. For letters, the postage meter (211) is designed to print the postage meter stamp directly onto the letter. For items such as packages or letters that are not fed through the postage meter, the postage meter is preferably capable of printing and dispensing a postage meter strip for subsequent affixation onto the item by the user. Preferably, a rotatable postage meter is used which will dispense the stamp in the form of a postage meter strip directly to the user through the outer housing. This postage meter rotation system (205) is completely controlled via the computer (1308) and digital I/O port B (See FIG. 6A). The computer (1308) will utilize a software control program which rotates the meter according to pre-determined conditions. If the postage meter (211) is in the home or retracted position (b) as shown in FIG. 4B, for example, the software program via the computer (1308) will cause the postage meter (211) to move forward toward the front side of the outer housing (position c) utilizing a horizontal linear actuator (207) and a translation table (216), as shown in FIG. 4C, for example. This movement will bring the postage meter (211) to a position for receiving a letter and for printing a postage meter stamp directly onto the letter.

Figure 4D:
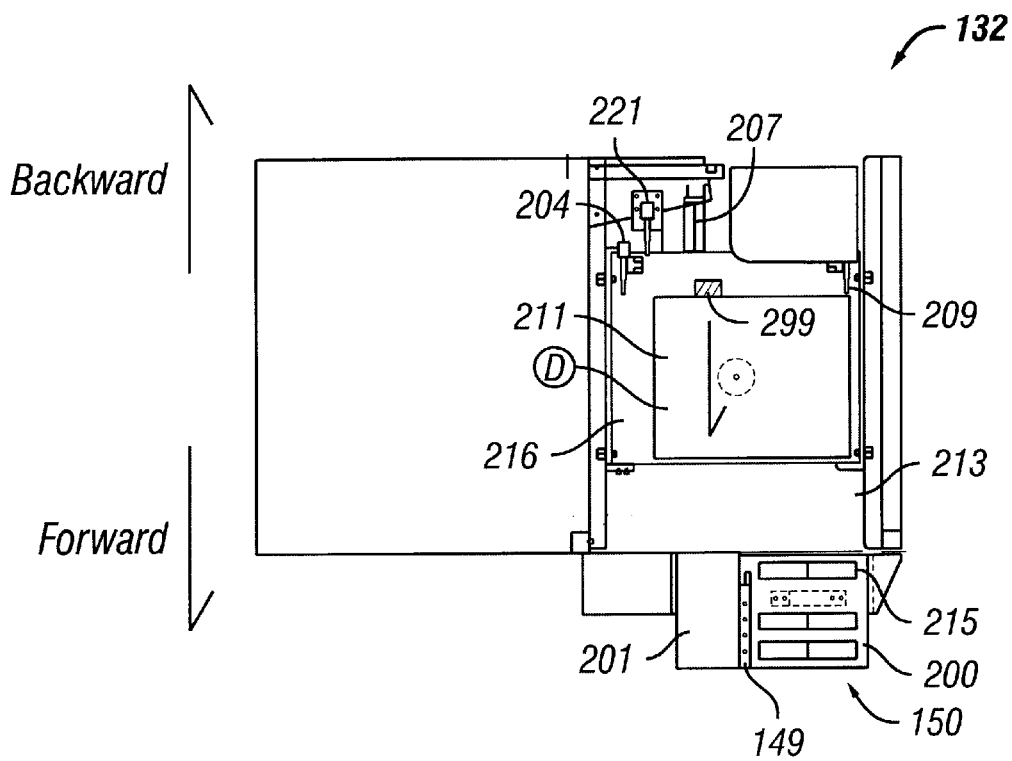
FIG. 4D is a top view of the inventive system's rotatable postage meter at elevation +40.00 showing the rotatable postage meter rotated and in the retracted, home position for printing and dispensing a postage meter strip.
Figure 4E:
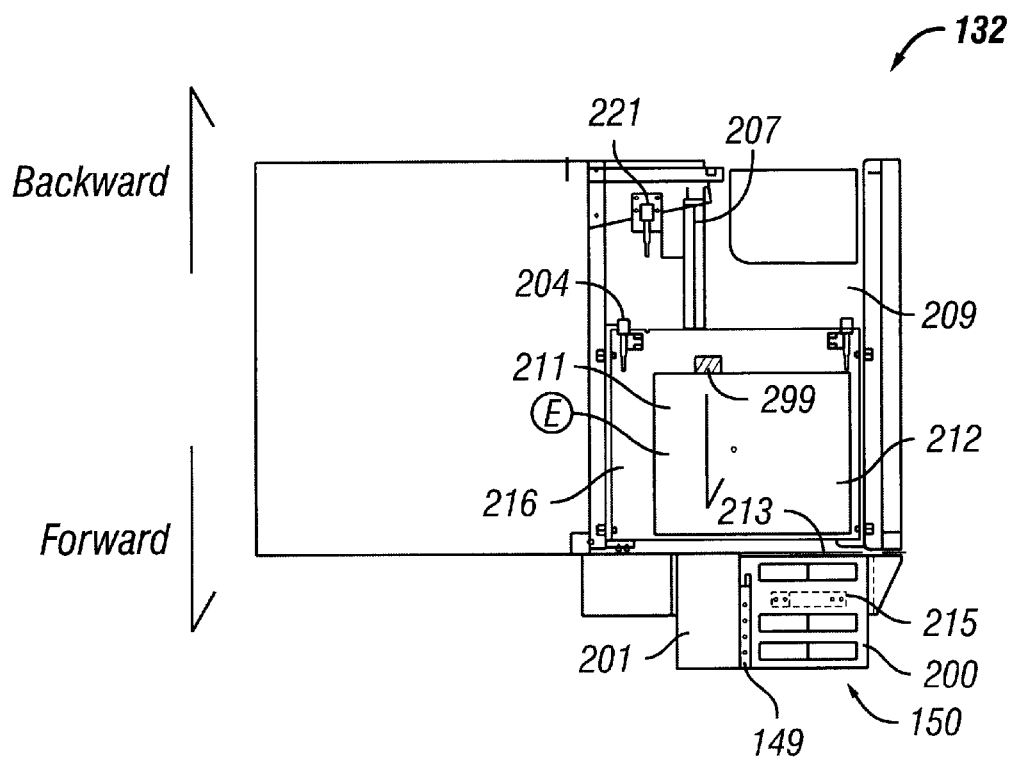
FIG. 4E is a top view of the inventive system's rotatable postage meter at elevation +40.00 showing the rotatable postage meter is the forward position and ready for printing and dispensing a postage meter strip.
Figures 1, 6A:
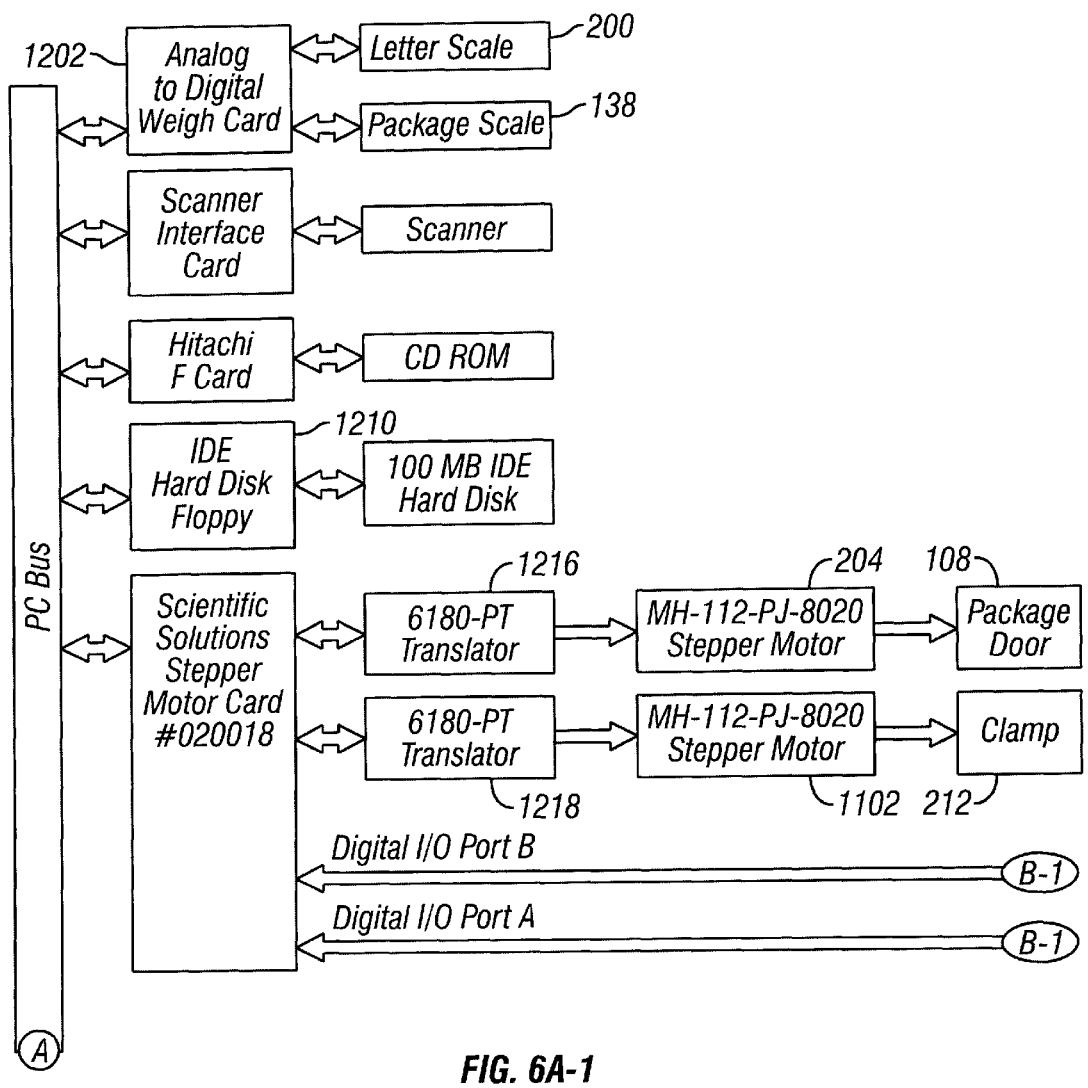
FIGS. 6A–6C illustrates the electronic circuitry for the inventive system, in particular the computer interaction with the various peripherals, input/output cards, control cards, and I/F cards.
Figures 2, 6A:
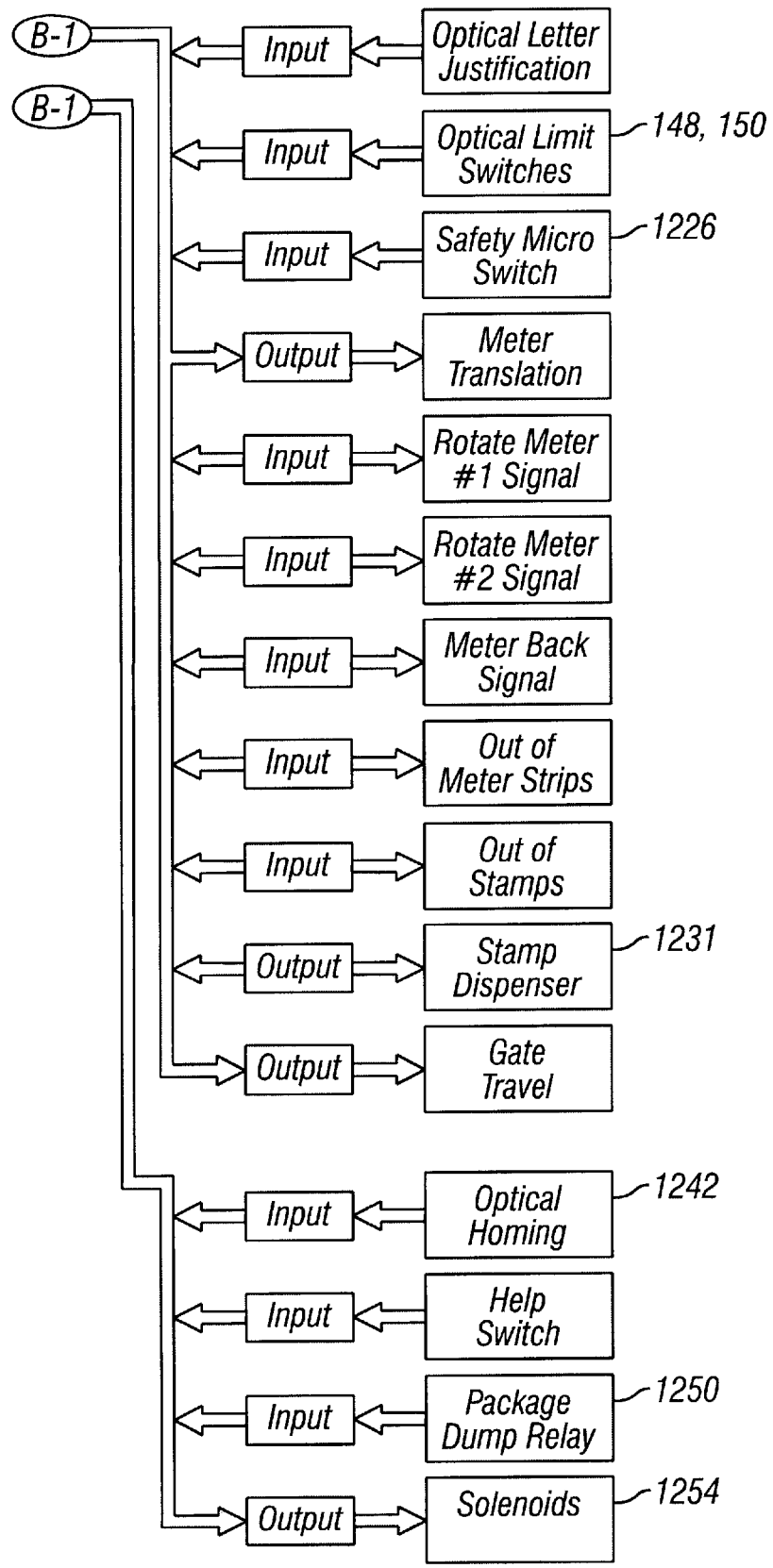
Figure 6B:
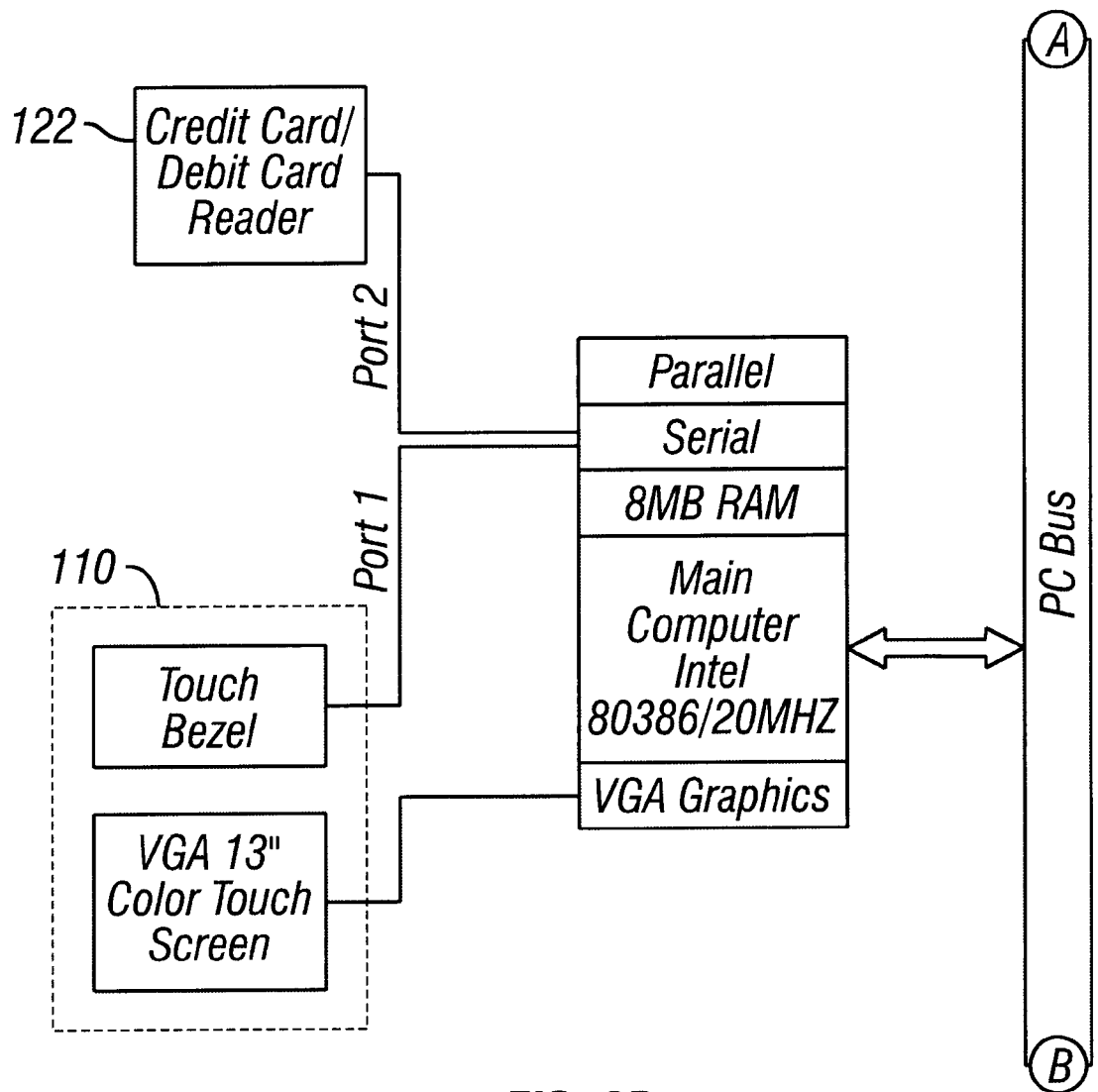
Figure 6C:
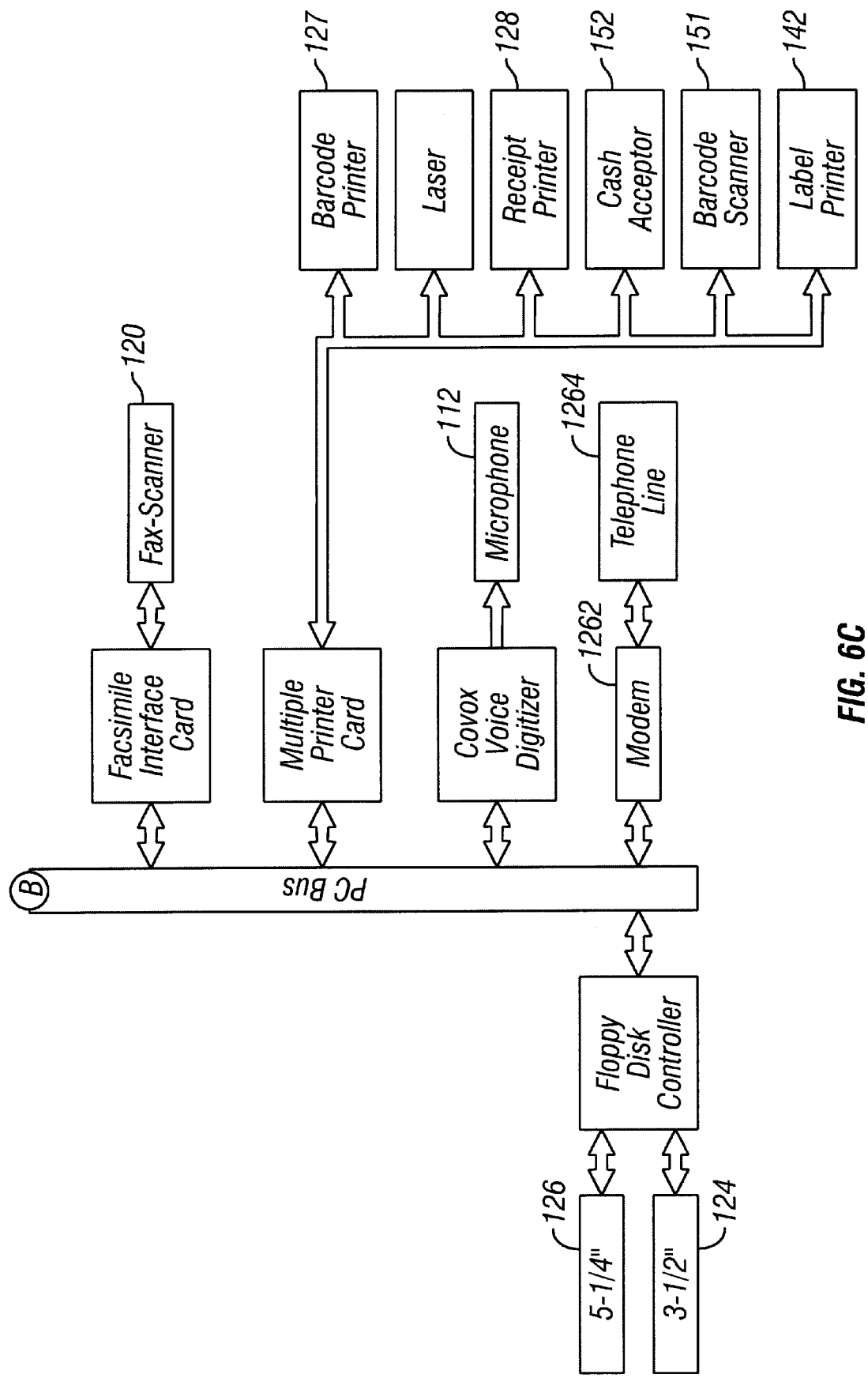

The inventive system (100) most preferably comprises an automatic feed transport system (149) which is capable of automatically feeding the letter directly into the postage meter (211). As shown in FIGS. 4A–4E, in particular FIG. 4A, the automatic transport system (149) preferably comprises a series of rollers (149a) contained within a letter platform (150). Integral with the platform (150) is a meter strip plate (201) and an electronic letter weighing scale comprising a weigh plate (200) and a load cell (215). To weigh the letter, the user places the letter onto the weigh plate (200). The presence of the letter is then detected by an optical sensor (225). The load cell (215), which is connected to the computer (1308) via Analog to Digital weigh card (1202) and the software program, as shown in FIGS. 6A–6C, will weigh the letter. However, the load cell will not weigh the letter until such time as the user has removed his or her hand. This is done by utilizing a software algorithm, which will detect minute vibrations which are always present when a human being is touching a scale. The special weighing algorithm is also illustrated in its entirety in the attached microfiche appendices, specifically in Appendix B. While the letter (L) is being weighed, the computer (1308) simultaneously checks to see if the postage meter (211) is in the correct position to accept the letter through the automatic feed system (149). The computer determines the postage meter position by particularly looking into the inputs of limit switch (209) and limit switch (204). If limit switch (204) is in the ON position, then the postage meter is in the correct position to accept the letter. In this case, the computer will activate linear actuator (207) which will move the translation table (216) to the forward position (c) (FIG. 4C). However, if the computer detects that limit switch (209) is in the ON position and limit switch (221) is in the OFF position, it will cause the linear actuator (207) to retract until such time as limit switch (221) will be in the ON position. This operation is particularly important as the postage meter (211) cannot be rotated in any other position but the backward position. All rotation of the postage meter (211) to the letter position (c) or the postage meter strip dispensing position (e), as shown in FIGS. 4C and 4E, respectively, must take place in the backward position in which linear actuator (207) is retracted (positions b and d as shown in FIGS. 4B and 4D, respectively). Once this position is achieved, the computer will activate the rotation motor (202) to rotate the postage meter rotation table (203) which is supported on at least one rotation bearing (210).

Once the postage meter is in a forward position (in either letter position or meter stip position), the outer letter security door (213) will be opened utilizing linear actuator (214). This will allow the letter to be picked up by the postage meter (211) through an opening above the letter guide (212), as discussed further below, or will allow a postage meter strip to be dispensed from the meter strip holder (299) onto into the meter strip plate (201).

Once the letter is weighed, the computer will receive the weight measurement via the A/D weigh card (1202), and utilizing the rate tables stored on the computer hard disc (1210) and the software program, the computer (1308) will calculate the cost for sending the letter. After the system displays the charge amount to the user, the user is requested to touch the touch-screen (110) which will display an Approval Touch Button for purposes of continuing the transaction. Where an autofeed mechanism is not used, the user is asked to insert the letter into the letter acceptance slot (104), located behind the outer letter security door (213), to continue the mailing transaction. Alternatively, the user may select other options in lieu of continuing the transaction, in particular to cancel the transaction or perform a different transaction. Once the user touches this button, the computer will activate the postage meter (211) through relay (1231) (FIG. 6A), lower the outer letter security door (213), and then activate the automatic transport means (149) (if present). This will send the letter, guided by a letter guide (212), into the postage meter (211). Once the letter passes through the postage meter and is imprinted with the postage meter stamp, the letter will hit the letter deflector (208) which will direct the letter into a secured storage area, such a letter tray (134), preferably located below the postage meter as shown in FIGS. 1A and 4A. Once the letter passes through the postage meter (211), the outer letter security door (213) will close and will not open again until another letter is detected by the optical sensor (225) (FIG. 4).

At the end of any particular transaction, the inventive system requests whether the user wants a receipt. If the user chooses a receipt, a receipt printer (128) (FIGS. 1A and 6C) will print a detailed receipt which will include all the information about the user's particular transaction, including, for example, time, date, location, machine number, type and amount of transaction, and number of transactions.

Figure 16A:
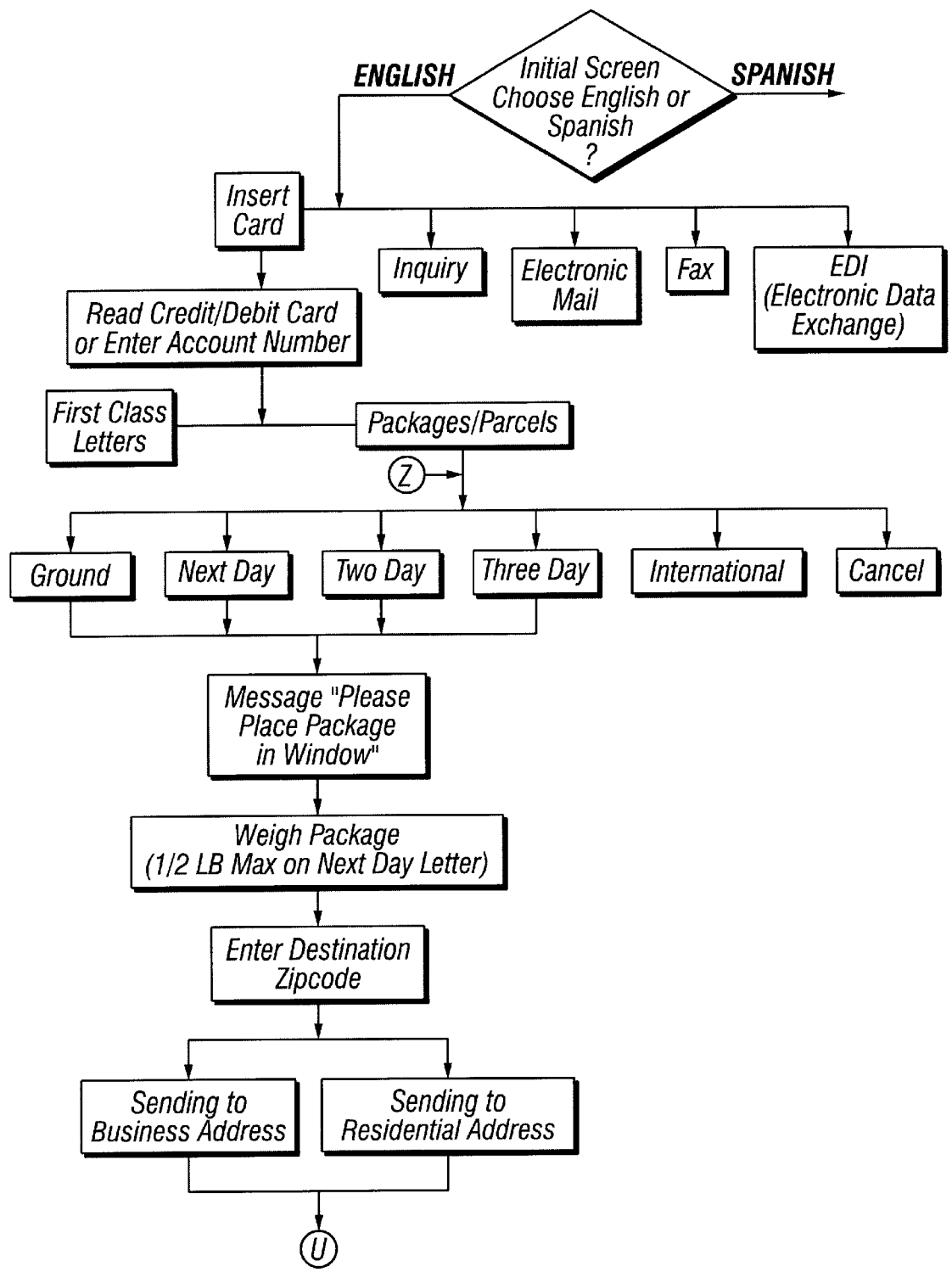
FIGS. 16A–16B are flow charts illustrating the processing of a package.
Figures 1, 16B:
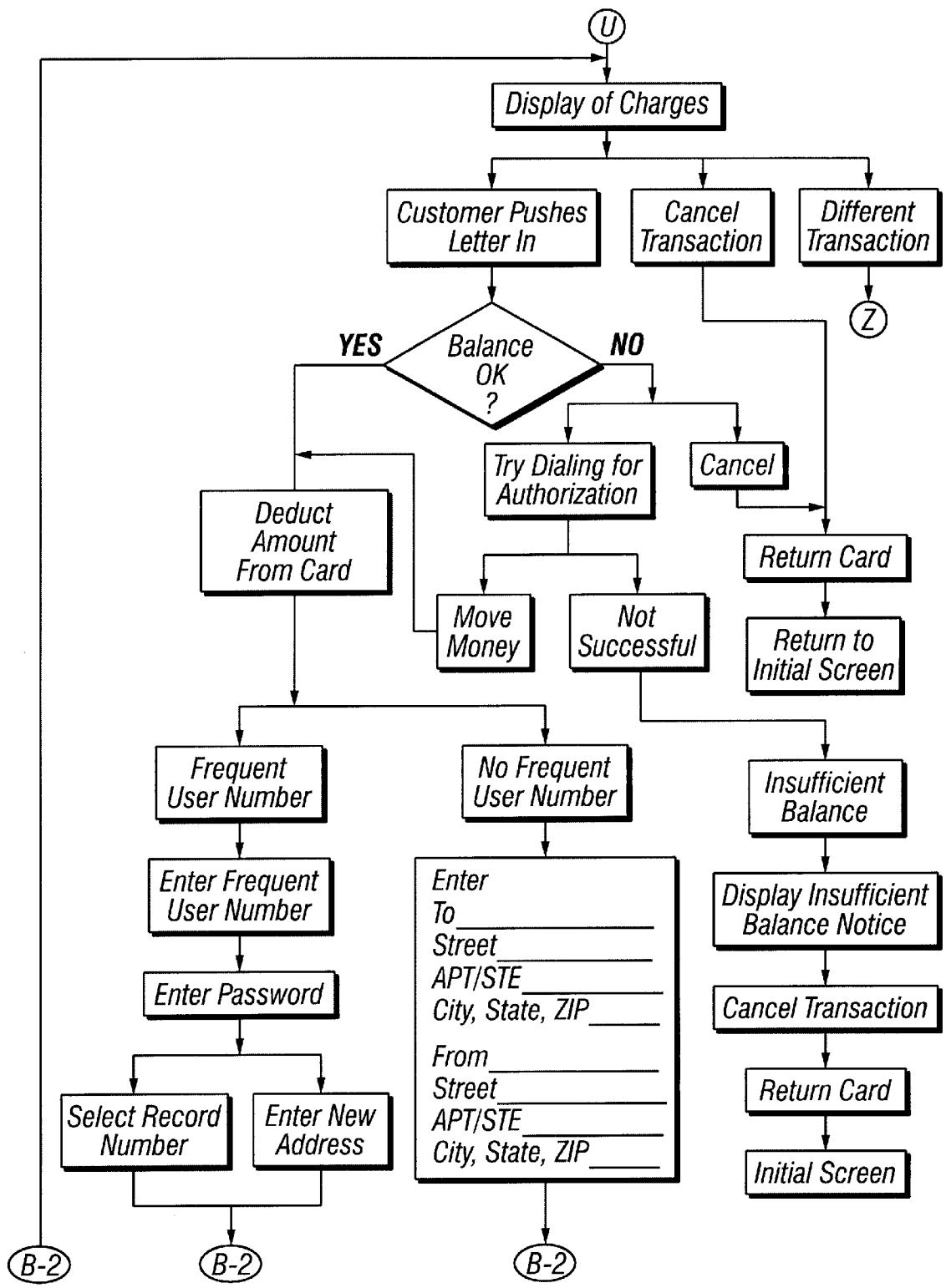
Figures 2, 16B:
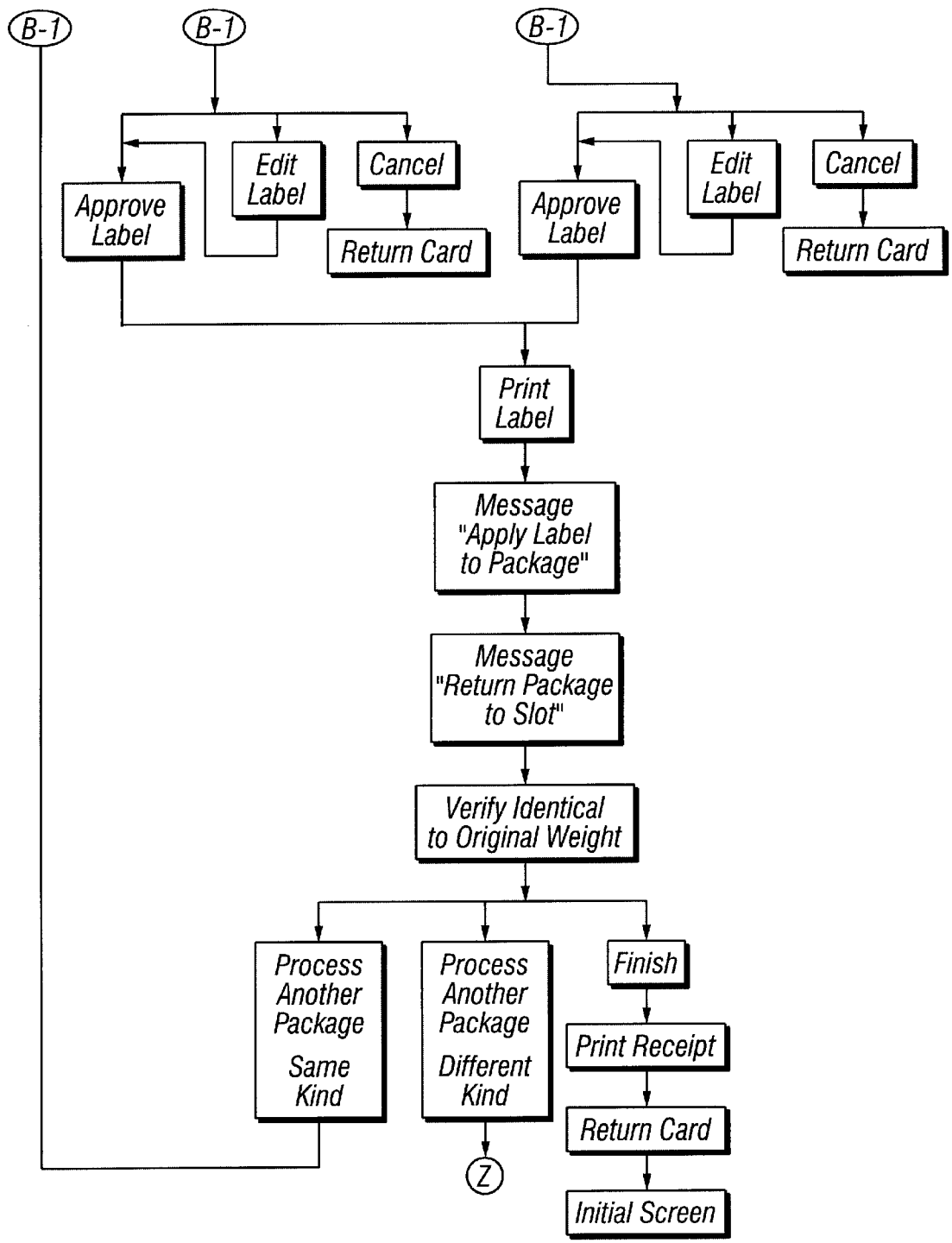

To process and store a package for mailing, the user preferably follows the flow diagrams illustrated in FIGS. 16A–16B. Similarly, the following description for processing and storing a package could be applied to a letter. Once the user has entered payment, most preferably his or her user identification information, and has selected to mail a package, the computer will activate a mechanism, including a software controlled system, to position the postage meter (211) into the correct orientation for printing and dispensing a postage meter strip directly to the user. As discussed above, the postage meter (211) is preferably also capable of directly printing a postage meter stamp onto a letter. Thus, in order to dispense a postage meter strip directly to the user for affixation onto a package, for example, a preferred aspect of the present invention is that the postage meter (211) be capable of rotating, as previously discussed in greater detail, so that the postage meter can dispense the postage meter stamp directly to the user through the front side of the outer housing (102a). For dispensing a postage meter stamp, if the postage meter is not in the home or retracted position (d), as shown in FIG. 4D, the software controlled system will properly orientate the postage meter by first retracting the postage meter from forward position (c) to the home position (b) by utilizing a linear actuator (207) if the limit switch (221) is not activated. Once the limit switch (221) is activated, the software control program will operate the rotation motor (202) which will rotate the postage meter about 180 degrees to a new position (d), as illustrated in FIG. 4D, which will be detected by limit switch (209). Once this rotation is completed, the postage meter will move forward to position (e), as shown in FIG. 4E, utilizing linear actuator (207), which will stop automatically by utilizing an internal switching mechanism.

Another aspect of the postage meter (211) is that it preferably contains an optical sensor (220) to sense the presence of postage meter strips in the special built-in meter strip holder (299). If the optical sensor (220) senses no meter strips in the holder (299), it will send a signal utilizing digital I/O port B. The computer (1308) in turn will display a video message on a display screen (110), or communicate via an audio means that the holder (299) is empty and inhibit the package mailing operation until such time as more meter strips are added to the postage meter (211).

The user will also be requested to input shipping designation information for the package, including the ZIP code, preferably via the touch-screen activated monitor (110). This information is processed through the computer (1308), and in conjunction with the weight information obtained later for the package, is used to calculate the shipping charge.

Once the computer (1308) identifies the correct information from the user information card, for example (i.e. if payment is made by this means), it will transmit this information via modem (1262) and telephone line (1264) (FIGS. 6B–16C) to an external credit/debit authorization center. Once the authorization is obtained, the software program will automatically activate the next screen which will request the user to make a selection between various services offered through the particular commercial carrier. By using a communication means, preferably either digitized voice instructions or video instructions, the user will be instructed to put his or her package into a secured item acceptance area (106). An outer security door (108) will automatically open, as discussed in more detail below, and the user will be able to place his package on an item-holding platform or bin (408) capable of tilting towards the back side of the outer housing (102b) to deposit the item into a secured storage area (410) at the appropriate time. The tilting mechanism used to deposit the item into a secured storage area (410) is discussed in more detail below.

Figure 3:
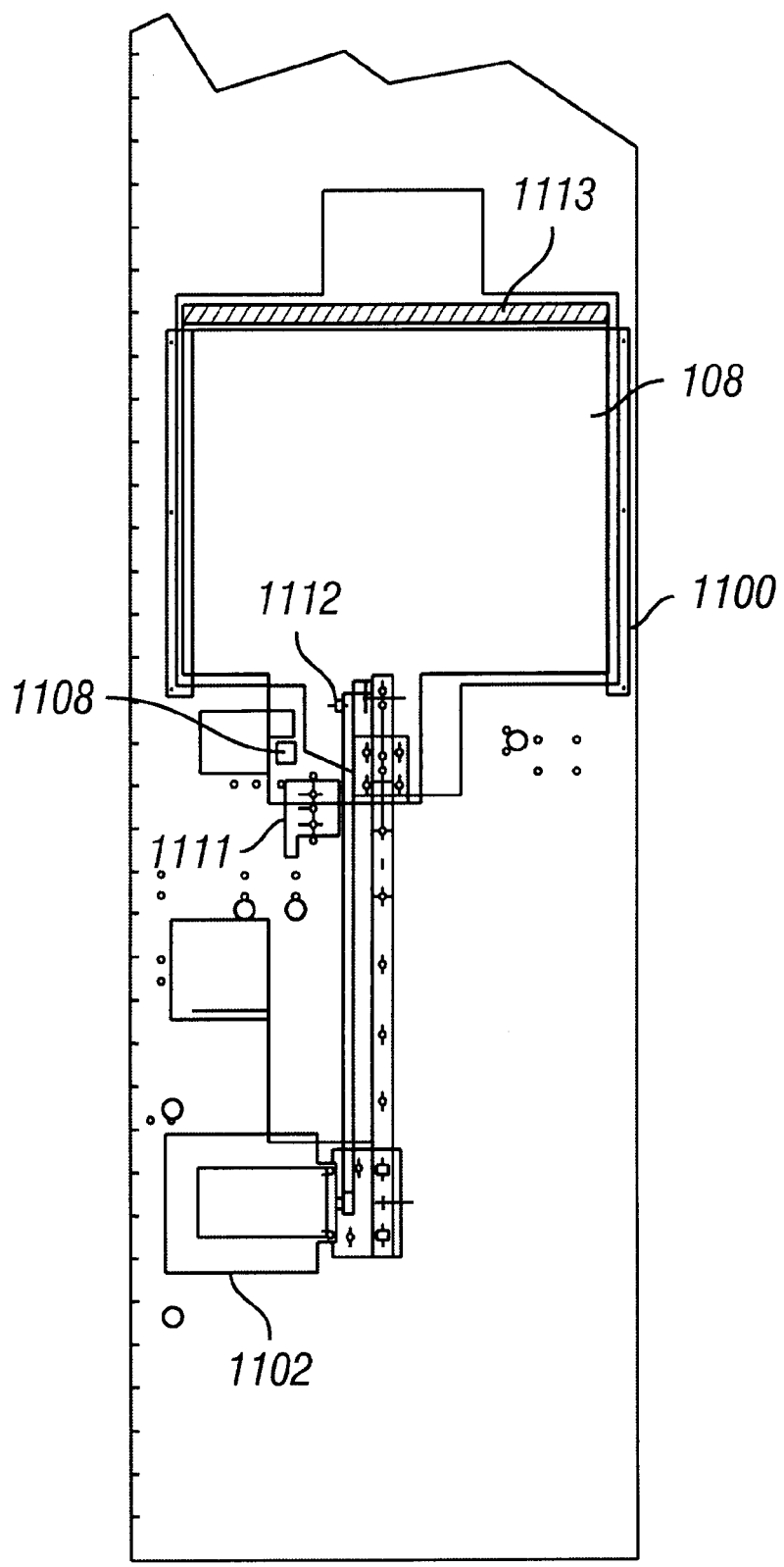
FIG. 3 is a front elevation view of tile outer door mechanism of the secured item acceptance area.

Referring now to FIG. 3, the outer door (108) operating mechanism includes the outer door (108), guides (1100), pulley (1112), stepper motor (1102), optical sensor (1108), locking solenoid (1111), and flexible curtain (1113). Once the user selects to send a package, the computer (1308), utilizing a software control program, will unlock locking solenoid (1111) and activate stepper motor (1102) which will lower the outer door (108) to a pre-determined position. Once the user has completed his transaction and placed the package back onto the item-holding platform (408), the computer (1308) will activate stepper motor (1102) and raise the door to a level in which the optical detector (1108) will be blocked. The computer (1308) will release the locking solenoid (1111), which is spring-loaded in the locking position. This is done in order to keep the outer security door (108) locked at all times, including during a loss of electrical power. At this point, the weighing scale will verify that the package weight did not change, as discussed in more detail below. When the outer security door (108) closes, an intentional gap is left open which is covered or closed by a flexible curtain (1113) in case some user should leave his hand on the door while the door is being raised. By leaving this intentional gap, the outer security door (108) will never close to the point of squeezing the user's hand.

Figure 2A:
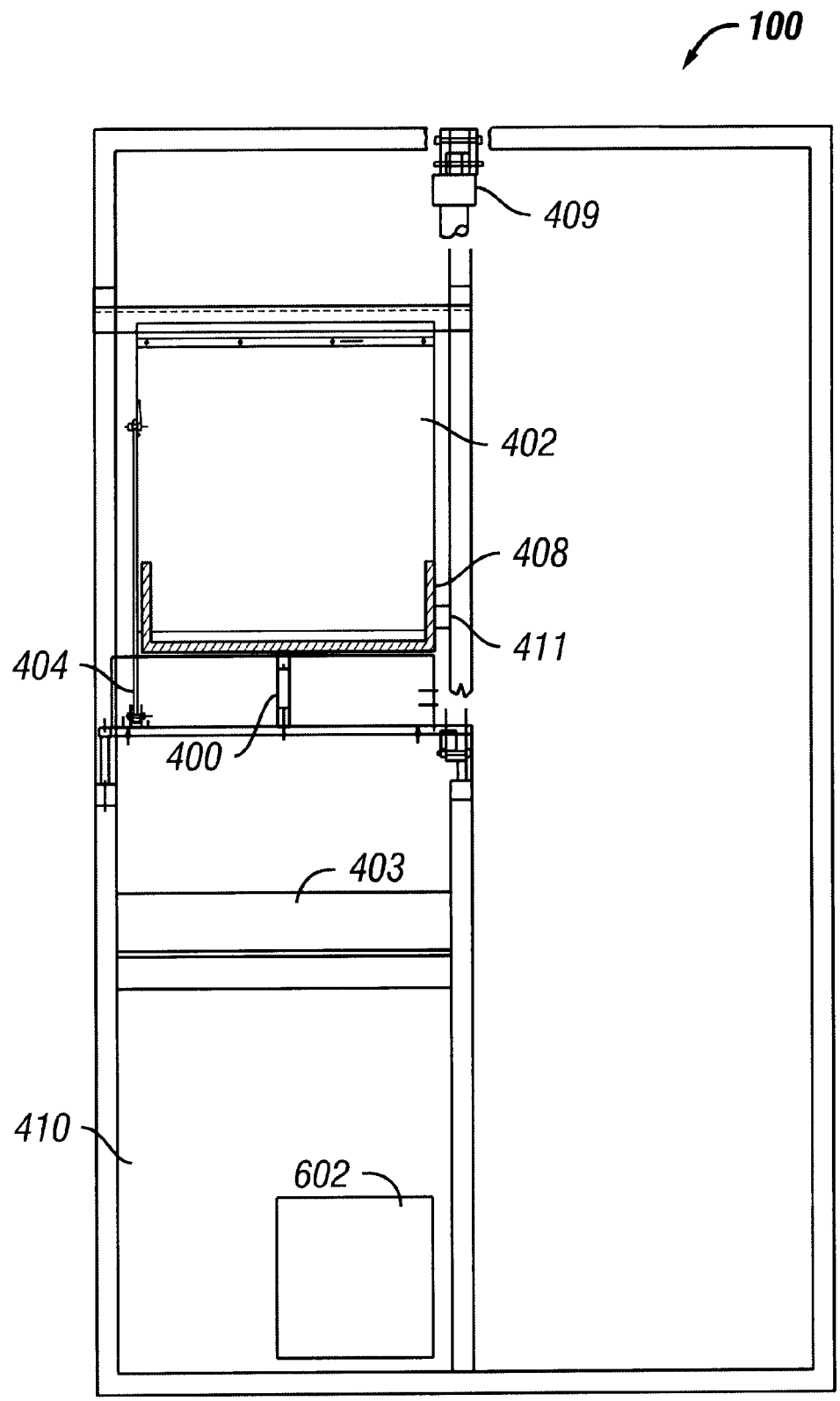
FIG. 2A is a front elevation view of the inventive mail system illustrated in FIG. 1A showing the package processing mechanism.
Figure 2B:
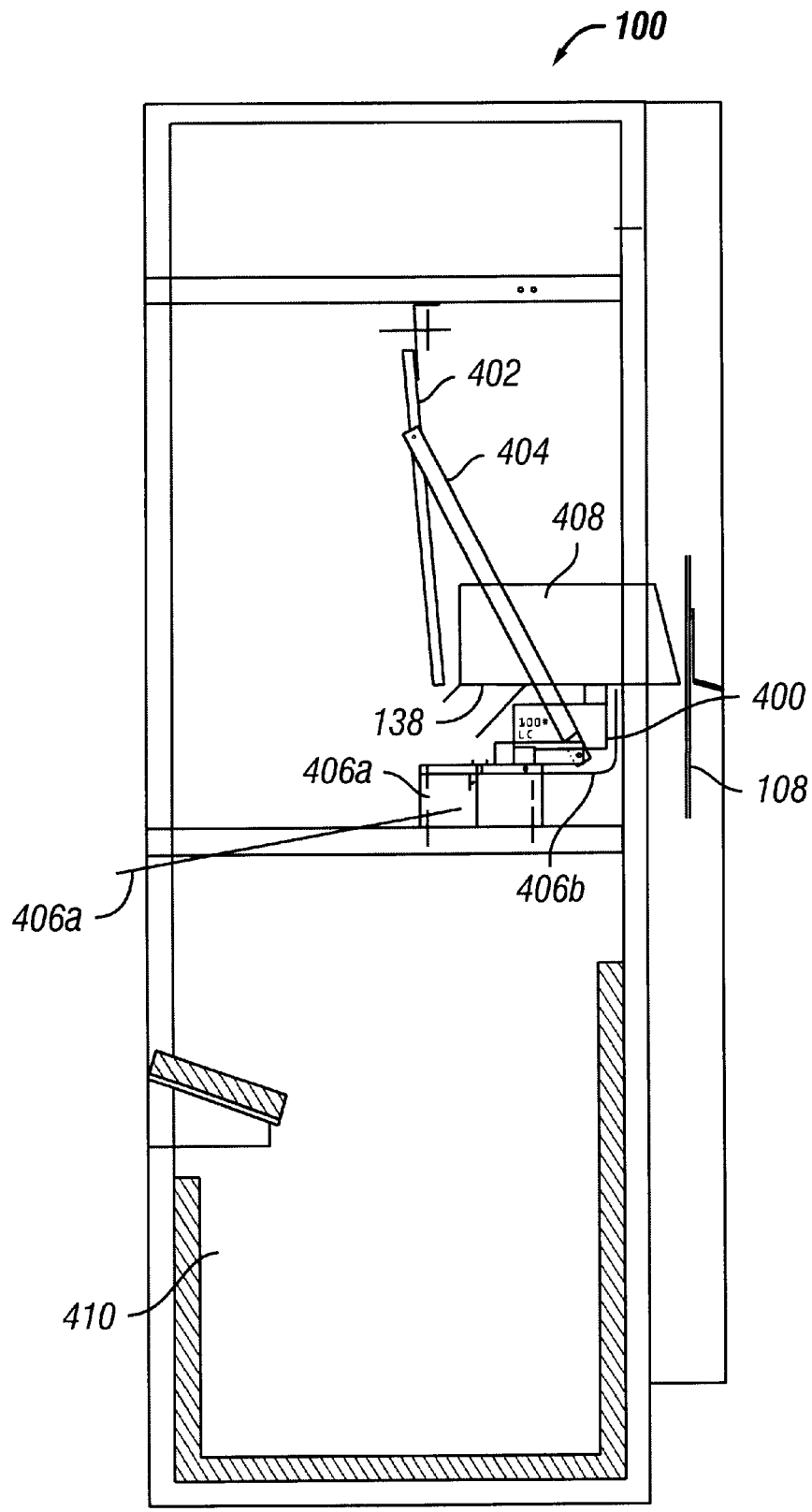
FIG. 2B is a side view of the inventive mail system illustrated in FIG. 1A and 4A showing the package processing mechanism.
Figure 2C:
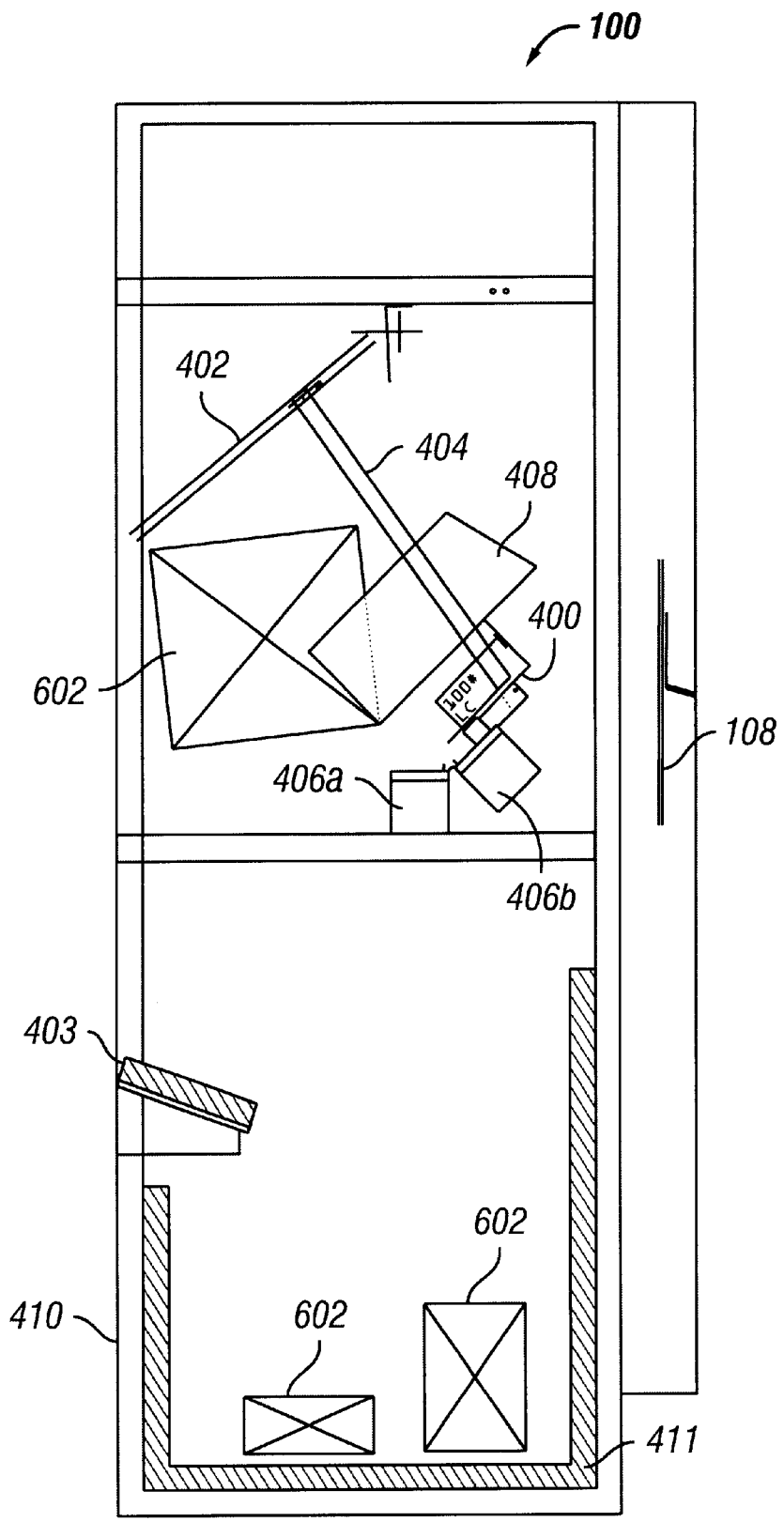
FIG. 2C is a side view of the inventive mail system illustrated in FIG. 1A and 4B showing the tilting mechanism for depositing a package from the secured item acceptance area into a secured storage area.

Referring now to FIGS. 2A–2C, a weighing device (138) comprising a load cell (400) integral with a rotating block (406b) is mounted below the platform (408) which in turn is integral with at least one mechanical arm (404) used to move the inner door (402). The rotating block (406b) is movably secured to a fixed block (406a). The user is instructed to place the item onto the platform (408), which will activate the weighing device to weigh the item via the load cell (400). The load cell (400), which is connected to the computer (1308) via Analog to Digital weighing card (1202) (FIG. 6A) and the software program, will not weigh the package (602) until such time as the user has removed his or her hand. This is done by utilizing a software algorithm which will detect minute vibrations which are always present when a human being is touching a scale, as discussed above. Once the item is weighed, the computer will receive the weight measurement via the A/D weighing card (1202) and utilizing the rate tables stored on the computer hard disc (1210) and the software program, as well as the shipping designation data entered, will calculate the cost of sending this package. The user will be asked to touch the screen (110) which displays an Approval Touch Button for continuing the transaction. Alternatively, the user may select other options in lieu of continuing the transaction, in particular to cancel the transaction or perform a different transaction. Once the user touches this button, the computer will activate the postage meter (211) through relay (1231), which will lower the outer letter security door (213), and the postage meter (211) will dispense a postage meter strip onto the meter strip plate (201). The user will then be instructed to paste the meter strip onto the package (602).

If the user desires to print his own shipping label, he will be able to do so by touching a print label touch button which will activate either a touch-screen alphanumeric keyboard (110) or a hidden-keyboard (156), which will come out for the user to use, such as that illustrated in FIG. 1B, for example. Once the user has completed typing in the label, he will again touch the Print Label Button, at which time the hidden keyboard (156) will retract, and a label will be printed utilizing package label printer (142) (FIGS. 1A, 1B and 6C). A user may also select to print a bar code label which can be utilized as a Zip+4 label or a tracking label. This label will be printed automatically using the address information entered by the user and utilizing bar code printer (127) (FIGS. 1A, 1B, and 6C).

Once the user has completed pasting on the postage meter strip, the address label, and optionally the bar code label on his package, he will return the package to the secured item acceptance area (106), specifically onto the item-holding platform or bin (408). At this time, the outer security door (108) will automatically close to prevent the user from having access to the package. Once the outer security door (108) is closed, the computer (1308) will perform a second weighing in order to verify that the package weight has not been changed. If the second weight amount does not differ from the first weight amount, the mechanism for depositing the item into the secured storage area is activated by means of a linear actuator (409). The linear actuator (409) causes the platform (408) to tilt via using at least one mechanical arm (404), which in turn will open the inner door (402), and the package (602) will preferably drop onto padded step (403) which dampens the fall of the package (602) as it is deposited into the storage area (410). Once this area is full to the point that the next item is unable to slide off the tilting platform (408), a built-in optical sensor (411) on the platform (408) will prohibit the movement of the linear actuator (409) and will cause a message to appear on the system that the internal storage area (410) is full. It will also send a message to this effect, utilizing Modem (1262), to an external monitoring station which will inform the carrier to provide an unscheduled pick-up.

If the second weight amount is different from the first weight amount, the outer security door (108) will automatically open, and the system will instruct the user to remove the package, thus cancelling the transaction.

The user will be able to repeatedly process other packages, one at a time, utilizing the same steps, but without requiring the use of his or her user identification information card again. Once the user has completed all of his or her transactions, the user may request a printed receipt which will be printed utilizing receipt printer (128).

If the user decides to buy a book(s) of stamps, which are the standard type provided by the U.S.P.S., he will be able to do so by either paying with his credit/debit card or utilizing cash (dollar bills) via a cash acceptor (152). To utilize his credit/debit card, the user will follow a similar path as described previously, however he will select Book of Stamps. He then will be required to indicate, by touching the touch-screen, how many books he desires. Once he touches the desired number, the computer will operate the stamp dispenser relay (1231) and the books will be dispensed via the stamp dispenser (153). If the user selects cash, he will be instructed on the screen to place his money into the cash acceptor (152). Once the correct amount of cash is received by the system, which is transmitted to the computer via a communication port 2 (FIG. 6B), the computer (1308) will activate relay (1231), which in turn will dispense the correct number of books through stamp dispenser (153). The inventive system (100, 101) may also include a user pre-processing area comprising, for example, a work tray (114) and a ruler (116) to assist the user in preparing his or her letters or packages for processing and storing in the system.

If the user desires to send his letter via Electronic Mail (E-Mail) or to utilize the built in FAX machine (120), he can do so by swiping or inserting his credit/debit card through or into the magnetic card reader (122). However, the user will be requested through the instructions provided by a communications means, such as a digitized voice system or a touch-sensitive screen (110), to either insert his floppy disc into the floppy disc drive [(124) 3.5 discs or (126) 5.29 discs] or insert his letter into the FAX machine (120) top slot. The computer (1308), which has a software program to accept this kind of information, will automatically FAX the letter utilizing Modem (1262) to its destination or will transmit the file read off the floppy discs (124, 126) to the appropriate telephone number requested by the user utilizing Modem (1262).

The U.S.P.S. or other carriers will provide scheduled pick-up service on the system. The postal worker will open the two front doors of the system utilizing lock (154). By opening the two doors, the worker will be able to collect the letters from the letter tray (134) and the items, preferably packages, from the lower storage area (410). The user will also be able to print a shipping and mailing manifest which will give a summary of the different letters and packages accumulated since the previous pick-up. FIG. 1A shows a preferred placement of the shipping and mail manifest printer (144) and a full-size (i.e. 8½×11) auxiliary manifest printer (140).

Certain commercial carriers, such as the United Parcel Service (U.P.S.), for example, require the affixation of a tracking bar code onto the package or letter. U.P.S., for example, provides labels or forms pre-printed with a tracking bar code for affixation onto an envelope. Thus, as discussed above, another preferred alternative embodiment of the present inventive system (101) is an automated mail processing and storing system comprising a tracking bar code system which can (1) detect whether the tracking bar code is present on the item and (2) generate and/or allow the entry of a tracking bar code for a mail item.

A system comprising such a tracking bar code system is illustrated in FIG. 1B. As discussed above, however, it is contemplated that additional features, such as a letter weighing scale or postage meter, for example, could be included, as well.

Figure 5:
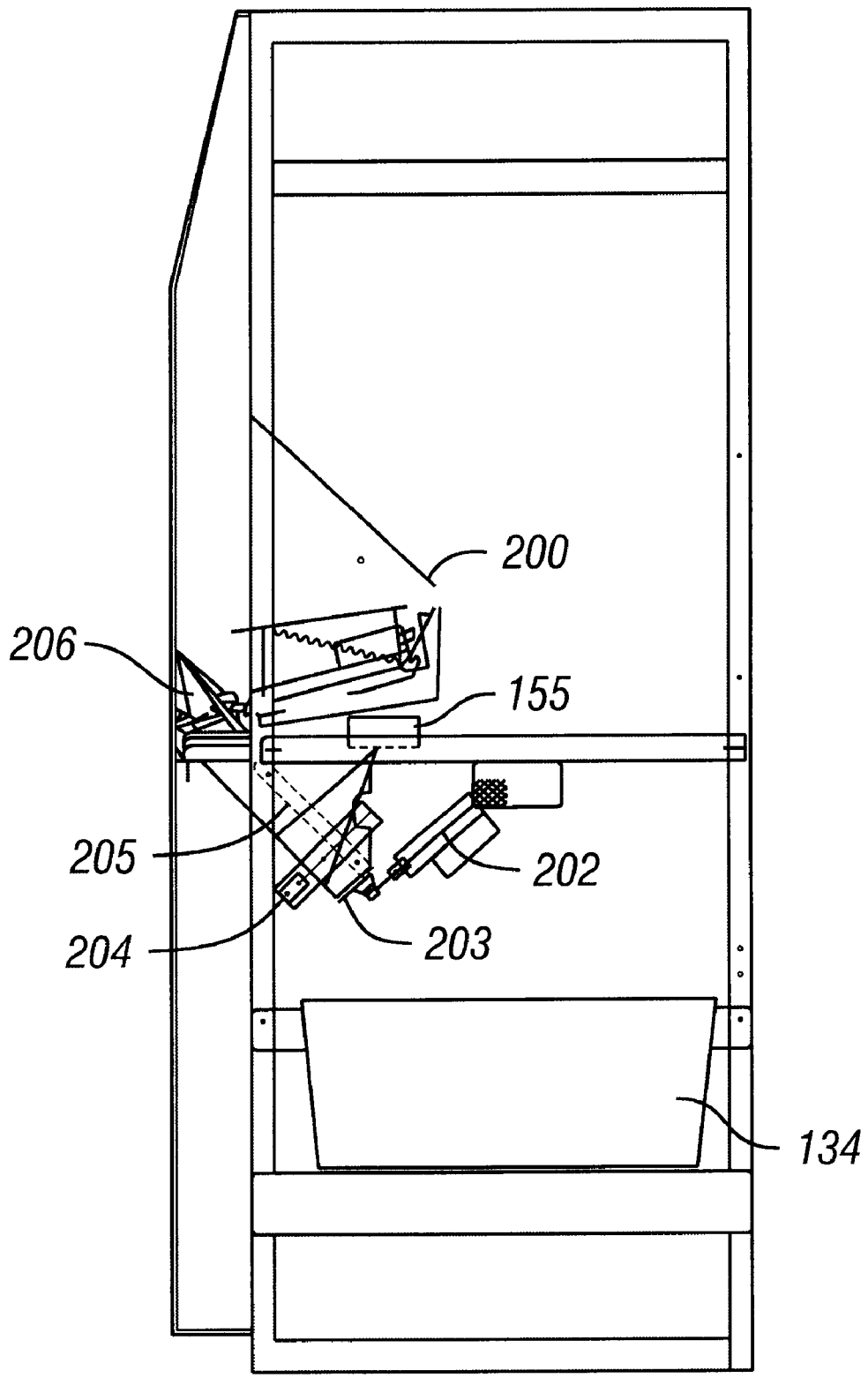
FIG. 5 is a side view of the alternate embodiment of the inventive system showing the internal tracking bar code verification system.

Referring now to FIGS. 1B and 5, the mailing system (101) preferably contains an area for processing letters and an area for processing packages. For processing letters and packages, the user begins the operation of the system (101) the same way as for the system (100) described above and illustrated in FIG. 1A. However, for processing letters for U.P.S., for example, the use of special labels or forms containing the tracking bar code for subsequent affixation onto an envelope does not necessitate the use of a weighing scale or postage meter. Similarly, while U.P.S. as well as perhaps some other carriers do base their charges for shipping a package in part on weight, no postage stamp is required, thus rendering a postage meter unnecessary. However, such a system could include a postage meter, if desired.

As discussed above, to perform a mailing transaction, the user will interact with a communication means which is mounted on the outer housing. A more preferred communication means is a display means, most preferably a computer monitor (110) equipped with a touch-sensitive screen with which the user interacts to input requested information for processing a mail item. The screen may be a conventional touch-screen activated by infra-ray, sonic waves, or resistance screen. While the operation of the present inventive mailing system will be described with reference to the touch-screen activated computer monitor, which is the most preferred type, other types of communication means are contemplated within the scope of the present invention may be employed. For example, a conventional computer monitor may be employed that is coupled with an alphanumeric key pad or keyboard. In this latter embodiment, the user inputs information into the mailing system via the key pad or key board. Alternatively, the communication means may be a voice-activated system, such as a digitized voice recognition system for receiving user input, such as that manufactured by Dragon Systems, for example, whereby the mailing system, via the software and computer (1308), operates in response to a user's spoken commands. In this third embodiment, the communication means may utilize a display means such as computer monitor for providing instructional information visually to a user or it may provide such information to a user by an audio means, such as a digitized voice system, for example.

To initiate a mailing transaction, the user approaches the mailing system and touches the screen to cause the screen, a digitized voice recognition system through microphone (112), and/or video instruction on a touch-screen (110), to be activated which will in turn instruct the user to perform the next step in the operation. Following the flow diagrams illustrated in FIGS. 11A–11B, 12A–12B, 13A–13B, 14A–14B, 15, 16A–16B, 17A–17B, and 18 the user selects a language for conducting the transaction, such as English or Spanish, for example. The user is then requested to enter a means for payment, most preferably user identification information for the purpose of payment, preferably by swiping or inserting a user identification data entry means such as a magnetic credit/debit card, through or into a magnetic card reader (122). Alternatively, the user could be instructed to input a user identification code, such as a personal identification number (PIN) and/or an account number, for example, via the touch-screen or a key pad/keyboard mechanism, for example. As discussed above, it is also contemplated that the inventive system could be modified by one skilled in the art, having the benefit of the invention's teachings and suggestions, to accept payment in the form of cash (i.e. coins and/or bills) after the charge has been determined. Once the computer (1308) identifies the correct information from the credit/debit card, for example, it will transmit this information via a modem (1262) and telephone line (1264) (FIG. 6C) to an external credit/debit authorization center. Once the authorization is obtained, the software program will automatically activate the next screen which will request the user to make a selection between various services offered through the commercial carrier.

For processing letters requiring a tracking bar code, this alternative embodiment of the inventive system (101) will ensure that no envelope is accepted into the letter tray (134) without first checking that the tracking bar code has been pasted or printed on the envelope, or has been allocated by the computer or scanned manually by the user using the external bar code scanner (151). For U.P.S. and perhaps some other carriers, the user must use designated envelopes and labels or forms for affixation onto the envelope supplied by the carrier, wherein the labels or forms contain the individual tracking bar code. The carrier will charge the user a fixed fee as long as the user uses the designated labels and envelopes for sending his or her documents. These labels and envelopes may be stored in a tilt-out supply cabinet (119), such as the one shown in FIG. 1B, for example. The user will then follow the digitized voice instructions or the visual instructions on the touch-screen 15 (110) to continue the transaction. Once the user has entered all the information requested by the carrier so that the computer can calculate the shipping charge, this shipping charge will be displayed on screen (110), and an Approval Touch Button will be displayed for purposes of continuing the transaction. Once the user has touched this button, the outer letter security door (206) will open to reveal a letter chute (205). Once the user places the envelope into the letter chute (205), the optical sensor (204) will activate the internal bar code scanner (155). Once the bar code scanner (155) reads the tracking bar code on the envelope, linear actuator (202) will open the inner letter door (203), and the envelope will drop into the letter tray (134) below. If the bar code scanner (155) is unable to read the bar code on the envelope, it will request the user to either turn the envelope over or to enter the tracking bar code number utilizing a touch-screen (110) keypad or the external bar code scanner (51), for example. Once this is completed, the linear actuator (202) will open the internal letter door (203), and the envelope will drop into the letter tray (134) below. However, if the user has selected to print his own shipping label using printer (142), for example, which automatically prints a tracking bar code, or has used the external bar code scanner (151) to scan the bar code before placing the envelope into letter chute (205), the computer will immediately activate linear actuator (202) which will open the inner letter door (203), and the envelope will drop into the letter tray (134).

For processing and storing a package for shipment by carriers such as U.P.S., for example, which require a tracking bar code, the same system components and method as discussed above for processing packages via U.S.P.S., or example, and illustrated in the figures are employed. Typically, however, the system does not require a postage meter, since the charge for shipping a package via U.P.S., for example, is not required to be placed on the package. However, the system can include a postage meter, if desired. In addition, the charge could be printed on the same label containing the tracking bar code if desired or required by another carrier.

Once the computer (1308) identifies the correct information from the user information card, or example (i.e. if this means for payment is used), it will transmit this information via modem (1262) and telephone line (1264) (FIGS. 6B–6C) to an external credit/debit authorization center. Once the authorization is obtained, the software program will automatically activate the next screen which will request the user to make a selection between various services offered through the particular carrier. By using a communication means, preferably either digitized voice instructions or video instructions, the user will be instructed to place his package into a secured item acceptance area (106). An outer door (108) will automatically open as discussed above, and the user will be able to place his package on an item-holding platform or bin (408) capable of tilting towards the back side of the outer housing (102b) to deposit the item into a secured storage area (410) at the appropriate time. The same outer door mechanism as discussed above for the inventive mailing system (100) and further illustrated in FIG. 3 is applicable to this embodiment of the inventive mailing system (101). Further, the same tilting mechanism used to deposit the item into a secured storage area (410) as already discussed above for the inventive mailing system (100) is used.

The user will also be requested to input shipping designation information for the package, including the ZIP code, preferably via the touch-screen activated monitor (110). This information is processed through the computer (1308), and in conjunction with the weight information obtained later for the package, is used to calculate the shipping charge. Referring again to FIGS. 2A–2C a weighing device (138) comprising a load cell (400) integral with a rotating block (406b) is mounted below the item-holding platform (408) which is integral with at least one mechanical arm (404) used to move the inner door (402). The rotation block (406b) is movably secured to a fixed block (406a). The user is instructed to place the package (602) onto the platform (408), which will activate the weighing device to weigh the item via the load cell (400). The load cell (400), which is connected to the computer (1308) via Analog to Digital weighing card (1202) and the software program, will not weigh the package until such time as the user has removed his or her hand. This is done by utilizing a software algorithm which will detect minute vibrations which are always present when a human being is touching a scale, as discussed above. Once the package (602) is weighed, the computer (1308) will receive the weight measurement via the A/D weighing card (1202) (FIG. 6A) and utilizing the rate tables stored on the computer hard disc (1210) and the software program, as well as the shipping designation data entered, will calculate the cost of sending this package. The user will be asked to touch the screen (110) which displays an Approval Touch Button for continuing the transaction. Once the user touches this button, he will be instructed to return the package to the secured item acceptance area (106) after he has pasted onto his package a tracking label provided by the carrier. Alternatively, if the user wishes to print his own shipping label, he will be able to do so by touching a print label touch button which will activate either a touch-sensitive screen keyboard or a hidden-keyboard (156), which will come out for the user to use. Once the user has completed typing in the label, he will touch again the Print Label Button, and a label will be printed utilizing package label printer (142). This label will be printed automatically using the shipping address information entered by the user. The printed label will include a tracking bar code which is utilized by the commercial carriers to track the movement of the package. Once the user has completed pasting the address label, which includes the tracking bar code, on his package, he will first scan this tracking label using external bar code scanner (151) and then place the package back onto the item-holding platform or bin (408) in the secured item acceptance area (106). At this time, the outer security door (108) will automatically close to prevent the user from having access to the package. Once the outer security door (108) is closed, the computer will perform a second weighing in order to verify that the package weight has not been changed. If the second weight amount does not differ from the first weight amount, the mechanism for depositing the item into the secured storage area via the tilting motor (138) will be activated by means of a linear actuator (409). The linear actuator (409) causes the platform (408) to tilt via at least one mechanical arm (404), which in turn will open the inner door (402), and the package (602) will preferably drop onto padded step (403) which dampens the fall of the package as it is deposited into the storage area (410) below. The area below the secured item acceptance area (106) is used as an internal storage area (410) for packages or letters. Once this area is full to the point that the next item is unable to slide off the tilting platform (408), a built-in optical sensor (411) on the platform (408) will prohibit the movement of the linear actuator (409) and will display a message on the system that the internal storage area (410) is fall. It will also send a message to this effect, utilizing Modem (1262), to an external monitoring station which will inform the carrier to provide an unscheduled pickup.

The user will be able to repeatedly send other packages, one at a time, utilizing the same steps, but without requiring him to use his user identification information card or commercial account number again. Once the user has completed all his transactions, he may request a printed receipt which will be printed utilizing receipt printer (128).

If the user desires to send his letter via Electronic Mail (E-Mail) or to utilize the built-in FAX machine (120), the same system and method as discussed above for mailing system (100) and shown in the figures, such as FIGS. 1A, for example, can be employed. Similarly, an E-Mail system, and F system, a postage stamp service area, and/or a user preprocessing area (as discussed above) may be included in this alternative embodiment of the inventive mailing system (101).

Once the user has completed all of the desired operations, he will be able to request a detailed receipt which will include the bar code tracking numbers. This receipt will be printed utilizing receipt printer (128) (FIG. 1B). This tracking information is particularly important to users who will be able to check the delivery information by utilizing touch-screen (110) and following the instructions on the screen. This tracking information will be received directly from the carrier main frame computer utilizing Modem (1262) and computer (1308).

Figure 18:
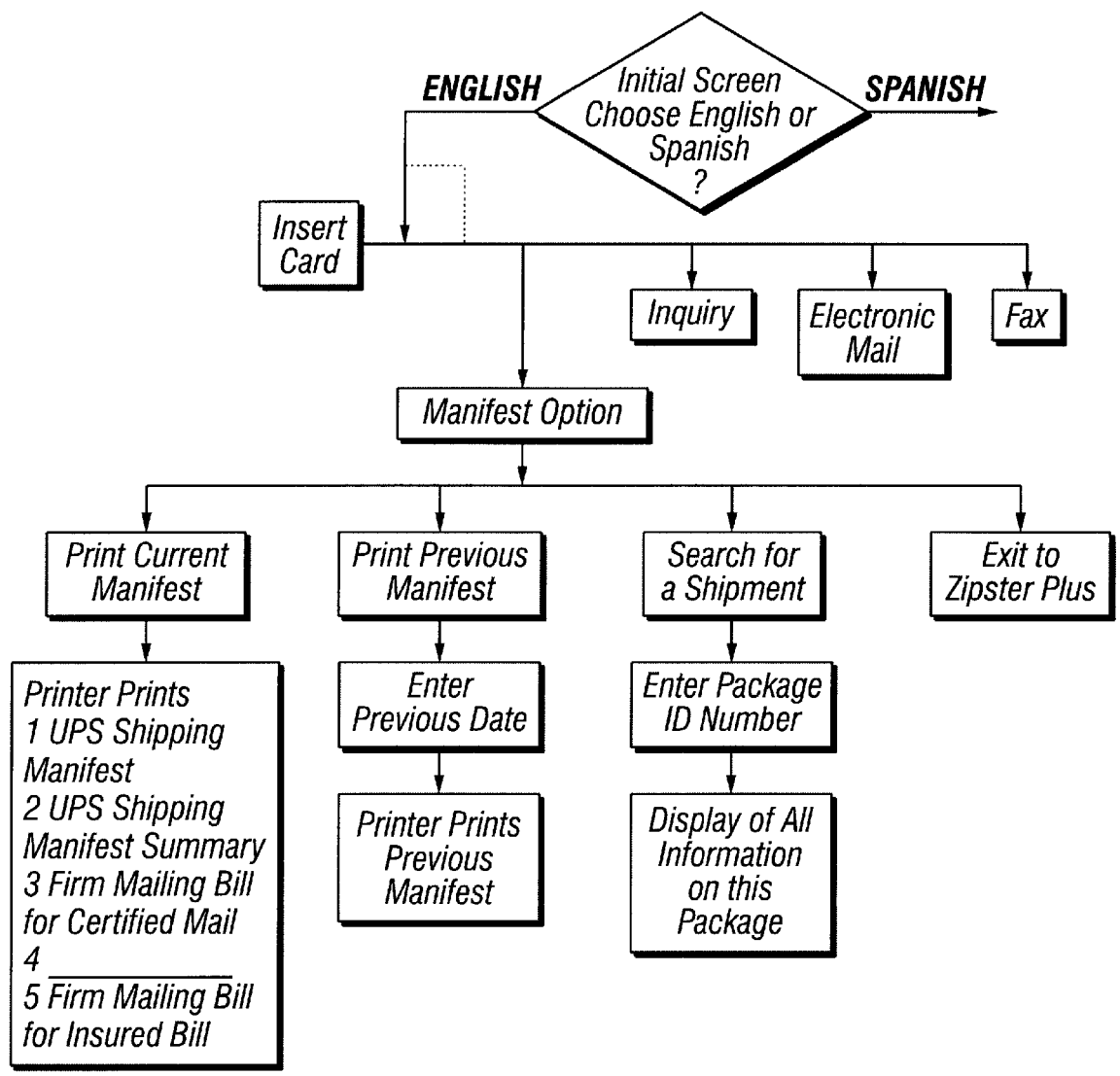
FIG. 18 is a flow chart illustrating the package and letter manifest process.

The inventive systems (100, 101) may also comprise a package and letter manifest option, as illustrated in the flow diagram in FIG. 18. By entering the appropriate code, authorized personnel can obtain hardcopy manifest reports of items received by the machine. The manifest copy is generated by a either a shipping and manifest printer (144) or a larger manifest printer (140) capable of printing larger (i.e. 8½×11) copies and are both contained within the outer housing of the system.

Figure 17A:
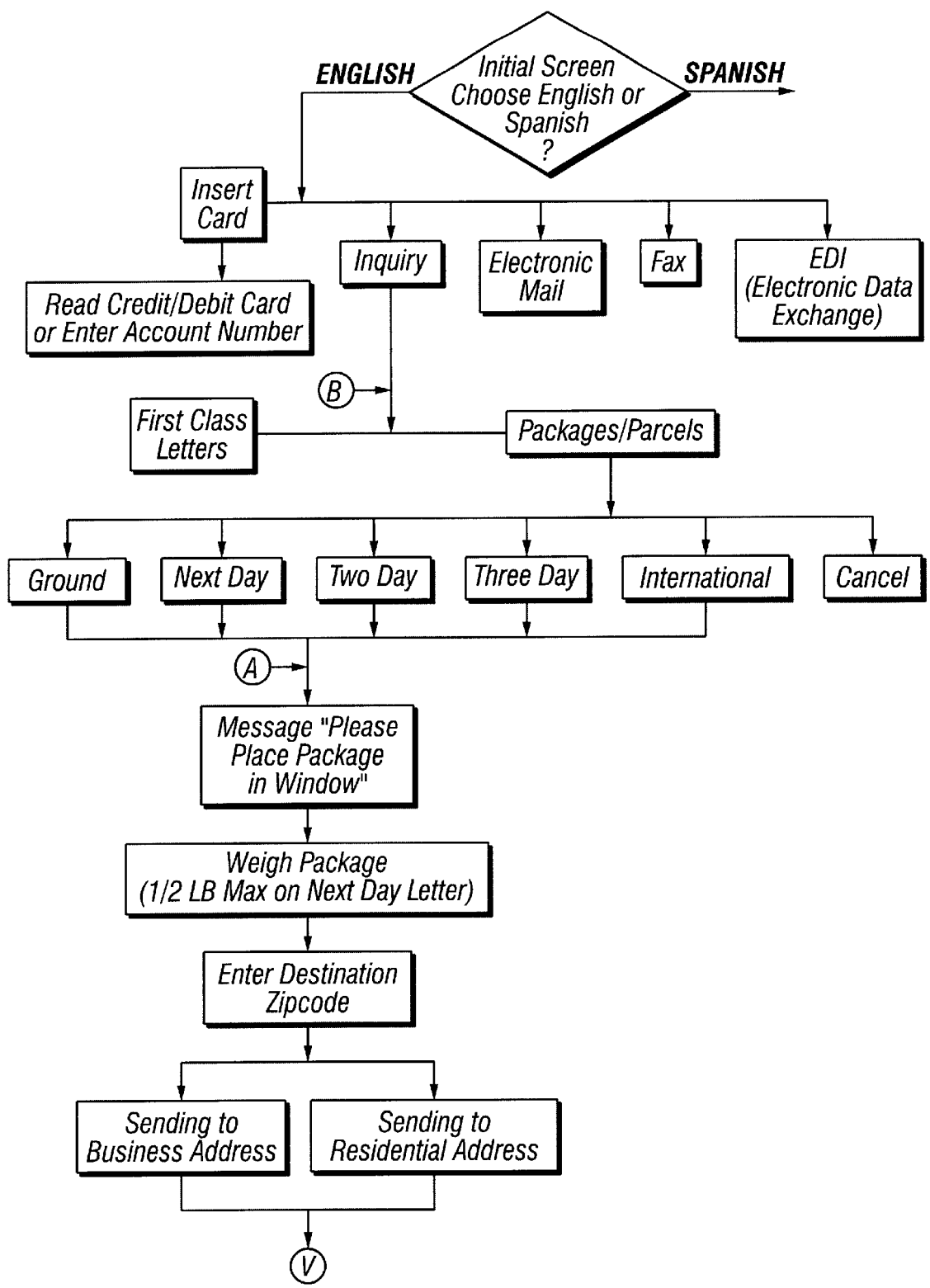
FIGS. 17A–17B are flow charts illustrating the customer inquiry process for a package.
Figure 17B:
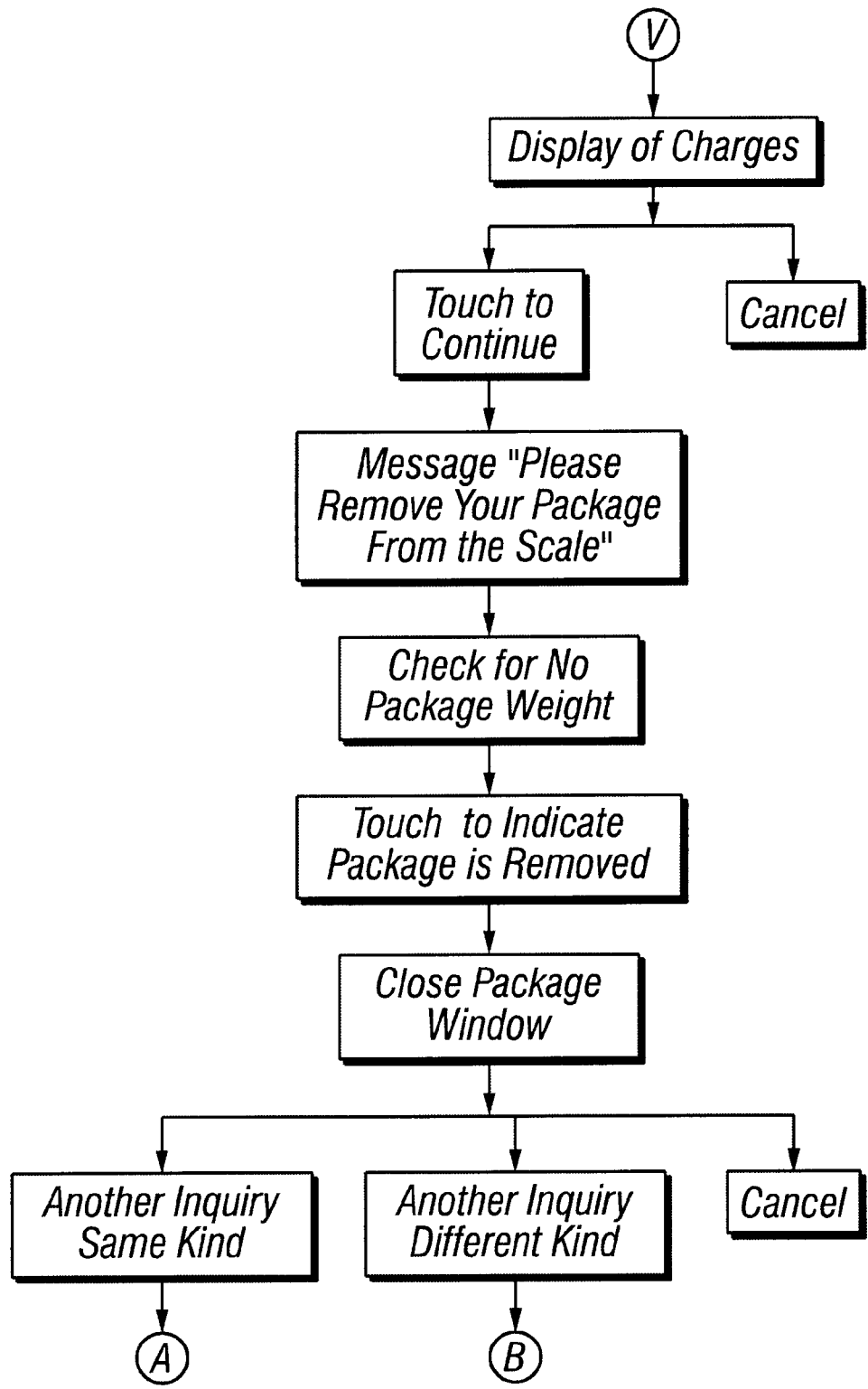

In addition to serving as a mail processing and storing system, the inventive system can also be operated by a user in an "Inquiry" mode, as illustrated in FIGS. 17A–17B. For example, a user may use the system simply to look up the nine-digit ZIP code for a particular address. This feature of the system may be provided free of charge as courtesy.

The present invention is also directed to a two-way communication system, in particular a communication means coupled to the inventive mail system's computer (1308), for communicating between the inventive system and an external computer located at a remote station or location. Both inventive systems (100, 101) may include, and preferably do include, this two-way communication system.

Preferably, the two-way communication system operates to provide the following functions:
(1) Credit authorization and charge reporting;
(2) Transaction and tracking information transfer;
(3) Error reporting and machine-full notification to a remote monitoring station;
(4) Automatic money transfer to the postage meter; and
(5) Electronic mail and EDI (electronic data interchange) facilities for users These functions are discussed in more detail below as well as in the source code provided in the attached microfiche Appendix A.

When the user inserts his or her user identification information, preferably by swiping or inserting a magnetic credit/debit card through or into a magnetic card reader, the machine dials out to the credit card authorization network and receives pre-approval for a designated amount of credit. At the end of the transaction, the inventive mail system stores the actual transaction amount in the computer (1308) for batch transfer, and the end of the day, the computer will be capable of providing a detailed summary of credit card usages for that day. If the user needs to spend more money than the pre-approved amount, the inventive mail system automatically acquires additional credit authorization.

The inventive system is preferably capable of storing detailed information on every transaction as well as tracking bar code information. At the end of the day, the inventive system transfers this information to a central accounting station.

The two-way communication system may also allow the service department of the particular carrier, for example, to be promptly notified electronically of fatal errors which would prohibit further use of the inventive system, and thus need immediate attention. Preventive maintenance messages and non-fatal errors which do not affect the usage of the machine will be sent periodically to a remote monitoring station.

The inventive mail system always maintains a minimum balance in the postage meter. When the balance reduces to a pre-determined minimum amount, the system will automatically dial out to a bank, for example, which will deposit a predesignated amount of credit in the postage meter, preferably through a TMS (telephone money service) mechanism, for example. The inventive mail system and meter identification numbers are transferred automatically to the bank for accountability.

The inventive mail system provides a user interface for electronic mail (E-mail) and electronic data interchange (EDI). A user can log into any remote system via the inventive mail system and use his or her personal credit card, for example, to charge for system usage time. A floppy disk device having an opening (124, 126) and coupled to the computer (1308) is available on the outside of the outer housing for data interchange.

The inventive system may also include a communication means coupling the computer with the postage meter to provide an automatic meter imprint date change mechanism. The postage meter automatically changes the imprint date at midnight. However, the inventive mail system can send commands through the communication means to the postage meter to activate and advance the date mechanism at a designated article pickup time to reflect and print a new date after the designated pickup for that day. The same date change mechanism is used for holidays and weekends when there is no scheduled article pickup.

The foregoing disclosure and description of the invention are illustrative and explanatory thereof, and changes in the size, shape, and materials, as well as in the details of the illustrated construction may be made without departing from the spirit of the invention.

What is claimed is:

1. An automated mailing system for processing and storing letters for subsequent shipment by a carrier comprising:
   (a) an outer housing having a back side and a front side;
   (b) a computer contained within said outer housing;
   (c) an instruction conveyance device coupled to said computer for communicating instructions to said user on how to operate said system to process a letter for mailing;
   (d) a voice recognition user input device on said outer housing and coupled to said computer and said instruction conveyance device for receiving input from said user to operate said system to process said letter for mailing;
   (e) a postage stamp meter contained within said outer housing and coupled to said computer for printing an indication of postage;
   (f) a scale coupled to said computer for weighing said letter prior to printing the indication of postage;
   (g) a computer program run on said computer that determines required postage responsive to the scale and controls the postage stamp meter to print postage responsive to the required postage; and
   (h) a storage area contained within said outer housing for storing said letters.

2. The system of claim 1, wherein said instruction conveyance device is a video display.

3. An automated mailing system for processing and storing letters for subsequent shipment by a carrier comprising:
   (a) an outer housing having a back side and a front side;
   (b) a computer contained within said outer housing;
   (c) an instruction conveyance device contained on said outer housing and coupled to said computer for communicating instructions to said user on how to operate said system to process a letter for mailing;
   (d) a user input device on said outer housing and coupled to said computer and said display for receiving input from said user to operate said system to process said letter for mailing;
   (e) a postage stamp meter contained within said outer housing and coupled to said computer for printing an indication of postage;
   (f) a scale coupled to said computer for weighing said letter prior to printing postage; and
   (g) a computer program run on said computer that determines required postage responsive to the scale, the computer program further including a routine that validates that the scale is stable before determining the required postage.

4. The system of claim 3, wherein the routine waits until the scale has been stable for a predetermined amount of time before determining the required postage.

5. An automated mailing system for processing and storing letters for subsequent shipment by a carrier comprising:
   (a) an outer housing having a back side and a front side;
   (b) a computer contained within said outer housing;
   (c) an audio instruction conveyance device coupled to said computer for communicating instructions to said user on how to operate said system to process a letter for mailing;
   (d) a voice recognition user input device on said outer housing and coupled to said computer and said audio instruction conveyance device for receiving input from said user to operate said system to process said letter for mailing;
   (e) a payment card reader coupled to said computer for receiving and verifying payment for processing, storing, and shipping letters;
   (f) a postage stamp meter contained within said outer housing and coupled to said computer for printing an indication of postage upon receipt and verification of payment by said payment card reader and approval by said user;
   (g) a scale coupled to said computer for weighing said letter prior to printing the indication of postage;
   (h) a computer program run on said computer that determines required postage responsive to the scale and charges a payment card inserted into said payment card reader responsive to the determined required postage, the computer program further including a routine that validates that the scale is stable before determining the required postage; and
   (i) a storage area contained within said outer housing for securely storing said letters.

6. A method of processing packages for subsequent shipment by a carrier, comprising the steps of:
   (a) providing instructions to user for initiating a mail processing transaction;
   (b) receiving input from said user relating to user identification information;
   (c) receiving said package from said user onto a scale;
   (d) monitoring the scale for detection of a stable weight;
   (e) weighing said package once a stable weight is detected to obtain a weight amount;
   (f) providing the weight amount to a software program to determine an appropriate charge;
   (g) providing the charge amount for processing the package to the user for approval by the user;
   (h) receiving verification input from the user approving the charge amount;
   (i) printing an indication of postage to be place on the package;
   (j) receiving the package in a secure holding area for subsequent shipment,
wherein step (b) includes the step of receiving voice instructions.

7. A method of processing packages for subsequent shipment by a carrier, comprising the steps of:
   (a) providing instructions to user for initiating a mail processing transaction;
   (b) receiving input from said user relating to user identification information;
   (c) receiving said package from said user onto a scale;
   (d) monitoring the scale for detection of a stable weight;
   (e) weighing said package once a stable weight is detected to obtain a weight amount;
   (f) providing the weight amount to a software program to determine an appropriate charge;

(g) providing the charge amount for processing the package to the user for approval by the user;

(h) receiving verification input from the user approving the charge amount;

(i) printing an indication of postage to be place on the package;

(j) receiving the package in a secure holding area for subsequent shipment, wherein step (a) includes the step of providing audio instruction.

8. A method of processing packages for subsequent shipment by a carrier, comprising the steps of:

(a) providing instructions to user for initiating a mail processing transaction;

(b) receiving voice instructions from said user relating to user identification information;

(c) receiving said package from said user onto a scale;

(d) weighing said package to obtain a weight amount;

(e) providing the weight amount to a software program to determine an appropriate charge;

(f) providing the charge amount for processing the package to the user for approval by the user;

(g) receiving verification input from the user approving the charge amount;

(h) charging a payment card of the user for the charge amount;

(i) printing an indication of postage to be place on the package;

(j) receiving the package in a secure holding area for subsequent shipment.

9. The method of claim 8, wherein step (a) includes the step of providing audio instruction.

10. The method of claim 8, wherein step includes the step of charging a debit card.

11. The method of claim 8, wherein step (h) includes the step of charging a credit card.

12. The method of claim 8, wherein step (h) includes the step of charging a reusable payment card.

\* \* \* \* \*